(12) United States Patent
Petilli et al.

(10) Patent No.: US 12,092,743 B2
(45) Date of Patent: Sep. 17, 2024

(54) SYSTEM, METHOD, AND APPARATUS FOR OBJECT VELOCITY AND ACCELERATION MEASUREMENT IN IMAGING SYSTEM

(71) Applicant: OWL AUTONOMOUS IMAGING, INC., Fairport, NY (US)

(72) Inventors: Eugene M. Petilli, Victor, NY (US); Francis J. Cusack, Jr., Wilmington, NC (US)

(73) Assignee: OWL AUTONOMOUS IMAGING, INC., Fairport, NY (US)

( * ) Notice: Subject to any disclaimer, the term of this patent is extended or adjusted under 35 U.S.C. 154(b) by 1021 days.

(21) Appl. No.: 17/062,441

(22) Filed: Oct. 2, 2020

(65) Prior Publication Data

US 2024/0280703 A1 Aug. 22, 2024

Related U.S. Application Data

(60) Provisional application No. 62/910,686, filed on Oct. 4, 2019.

(51) Int. Cl.
*G01S 17/894* (2020.01)
*G01S 17/10* (2020.01)
(Continued)

(52) U.S. Cl.
CPC ............ *G01S 17/894* (2020.01); *G01S 17/10* (2013.01); *G01S 17/42* (2013.01); *G01S 17/58* (2013.01);
(Continued)

(58) Field of Classification Search
CPC ........ G01S 17/894; G01S 17/58; G01S 17/88; G01S 17/42; G01S 17/931; G01S 17/10; G01S 17/66; G01S 17/89
(Continued)

(56) References Cited

U.S. PATENT DOCUMENTS 5,745,442 A * 4/1998 Herscher ............... G01S 7/4865
368/118
9,001,234 B2 4/2015 Petilli
(Continued)

*Primary Examiner* — Daniel L Murphy
(74) *Attorney, Agent, or Firm* — LOZA & LOZA, LLP

(57) ABSTRACT

A first light beam transmits from a first location to a region of interest at a time $t_{1a}$ and reflects off at least one object disposed in the region of interest, producing a first reflected light beam. A time of flight (ToF) counter is incremented until the reflected first light beam is received back at the first location, whereupon ToF counter stops at time $t_{1b}$. A second light beam transmits from the first location to the region of interest at time $t_{2a}$ subsequent to time $t_{1b}$ and reflects off the least one object to produce a second reflected light beam. ToF counter is decremented, starting from first count value, until the reflected second light beam is received back at the first location, whereupon ToF counter stops at time $t_{2b}$. A real-time velocity of the object is computed based at least in part on $t_{1a}$, $t_{1b}$, $t_{2a}$, and $t_{2b}$.

20 Claims, 16 Drawing Sheets

(51) Int. Cl.
  *G01S 17/42*   (2006.01)
  *G01S 17/58*   (2006.01)
  *G01S 17/66*   (2006.01)
  *G01S 17/88*   (2006.01)
  *G01S 17/931*  (2020.01)
  *G01S 17/89*   (2020.01)
(52) U.S. Cl.
  CPC ............. *G01S 17/66* (2013.01); *G01S 17/88* (2013.01); *G01S 17/931* (2020.01); *G01S 17/89* (2013.01)
(58) Field of Classification Search
  USPC ........................................................ 356/5.01
  See application file for complete search history.

(56) References Cited

U.S. PATENT DOCUMENTS

| | | |
|---|---|---|
| 9,344,660 B2 | 5/2016 | Petilli |
| 9,369,651 B2 | 6/2016 | Petilli |
| 9,595,558 B2 | 3/2017 | Petilli |
| 9,787,923 B2 | 10/2017 | Petilli |
| 9,917,592 B2 | 3/2018 | Yano et al. |
| 10,134,799 B2 | 11/2018 | Petilli |

\* cited by examiner

SYSTEM, METHOD, AND APPARATUS FOR OBJECT VELOCITY AND ACCELERATION MEASUREMENT IN IMAGING SYSTEM

FIELD

This disclosure generally relates to detecting and characterizing, using emitted light, an object in an area of interest. More particularly, this disclosure relates to a light detection and ranging (LiDAR) device and methods of use thereof, including use of LiDAR devices to detect the existence of one or more objects in an area of interest and to determine characteristics of the one or more objects, such as position, velocity, and/or acceleration.

BACKGROUND

LiDAR (light detection and ranging, also referred to as laser detection and ranging and sometimes referred to as LADAR) is a technology that uses laser technology to measure distances (range), speed, and at least some atmospheric parameters. A LiDAR system measures distances to objects by illuminating the objects with light and measuring the time required for reflected pulses to return to a sensor. LiDAR operates in a manner not unlike radar, but beams of laser light are used instead of radio waves. A laser is one example of a light source that can be used in a LIDAR system.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

There are various types of LiDAR systems, including those that are mechanically scanned and various types of solid state implementations, including microelectronic mechanical systems (MEMS), optical phased array, and Flash LiDAR. At least some "Flash" type Time of Flight (ToF) LiDAR systems illuminate the environment to be measured with pulses of light that are spatially dispersed in a fixed pattern or swept throughout a region of interest. Light beams reflected from objects within the region of interest are detected at the LiDAR by use of photodetectors sensitive to the transmitter wavelength. A timer measures the time elapsed from when the light pulses originated until they are detected, thereby providing one way to calculate the range to an object. In some systems, a point cloud or range image is traditionally calculated that characterizes the topography of the region of interest by aggregating the range to each transmitted and reflected light beam. Object velocity can be calculated, in the simplest example, by measuring an object's positional displacement over two successive laser flashes, by comparing two successive range images, and dividing by the temporal period between flashes.

Transmitter wavelengths in LiDAR systems, such as Flash LiDAR, are most often selected to be compatible with low cost and commoditized silicon detectors. In this manner, a digital focal plane array (DFPA) constructed purely of silicon can be employed that detects the reflected laser beams, digitizes the analog photodetector signals and reads out the digital LiDAR image as a complete frame that characterizes the physical environment of interest. Thus, a low-cost laser source is combined with a low-cost silicon DFPA, often featuring a high-density two-dimensional detector array, for a cost-effective LiDAR solution. Indeed, simple pre-processing of the digitized LiDAR image can also be achieved within the DFPA taking full advantage of the purely silicon architecture.

While the state-of-the-art LiDAR systems, such as those described above, can enjoy the advantages of low cost and high spatial resolution, at least some existing flash LiDAR system can suffer from acute deficiencies in several areas. Firstly, although silicon photodetectors are ideal for sensing visible wavelengths (and with deliberate doping schemes can also be made reasonably sensitive to near IR (NIR) wavelengths up to about one micron), LiDAR systems designed to operate at these visible and NIR wavelengths are inherently unsafe to the unprotected human eye. Consequently, LiDAR systems operating at visible and NIR wavelengths can be obliged to operate at very low laser power levels and low pulse frequencies, to avoid human harm, but such low laser power levels and low pulse frequencies can limit performance in such areas as maximum range and velocity resolution.

Furthermore, laser light of frequencies compatible with silicon photodetectors can suffer from poor transmission in adverse weather conditions, such as snow and rain, where the laser light is reflected and attenuated, further frustrating nominal range performance at eye safe power levels. Finally, powerful solar reflections within the LiDAR's Field of View (FoV) are readily detected by silicon photodetectors and, when present, may serve to blind the LiDAR making reliable and safe performance problematic not only in adverse weather conditions but in ideal conditions as well. For applications requiring a high degree of safety, where the LiDARs must operate at peak efficiency in all environmental conditions encountered, these shortcomings can tend to limit the purely silicon LiDAR's efficacy.

In applications where many different types of objects may be encountered, and where the objects' behavior may be diverse and capricious, it is vitally important to not only reliably and accurately measure the distance to each object but to reliably and accurately characterize each object's velocity as well. Knowledge of an object's position and velocity may be exploited to aid in object classification and predict future position and velocity. For example, in applications such as autonomous vehicle operation, accurate prediction of an object's path is fundamental to collision avoidance, collision mitigation and passenger comfort.

Velocity calculations as used in at least some contemporary systems may suffice for some applications, but such velocity calculations may be too simple and rigid for other applications. More sophisticated and flexible ways to determine velocity, as described for at least some embodiments described herein, can be advantageous for more demanding applications particularly where safety is a priority requirement. Indeed, for some applications, velocity measurements may be the only desired output, thereby transforming the LiDAR range detector to a Light Detection And Velocity (LiDAV) velocity detector. In at least some embodiments herein, having these velocity calculations performed on the DFPA, unencumbered by post processing methods and devices, can provide additional benefits, such as providing that each pixel readout and detected object readout is accompanied by an associated velocity.

Calculating object acceleration and deceleration is also vitally important to applications demanding time sensitive responses such as autonomous vehicle applications. For example, it can be important for an autonomous vehicle closely following a moving object to have instant and accurate data when the object rapidly decelerates to aid in avoiding or mitigating a collision. Traditional methods of calculating acceleration by processing the changes throughout three or more point clouds can be cumbersome and slow. In at least some embodiments herein, an arrangement is disclosed wherein a LiDAR is configured to operate in a Light Detection And Velocity and Acceleration (LiDAVA) mode, where the device delivers a real time acceleration map for objects of interest within the region of interest.

For example, in certain embodiments described herein, a LiDAR system with integrated velocity measurement device includes an illumination source, a digital focal plane array (DFPA), and an output timer. The illumination source is configured to provide illumination over a region of interest. In certain embodiments, this comprises a laser. The (DFPA), in some embodiments, is comprised of a photodetector array, control circuitry, digitization circuitry, velocity and acceleration measurement circuitry and readout circuitry. The photodetector array, in certain embodiments, is positioned to receive reflected beams, based on the illumination from the illumination source, from one or more objects of interest in the region of interest. In some embodiments, the photodetector array comprises a plurality of LiDAR detectors. In certain embodiments, the plurality of LiDAR detectors is configured into a 2D array of sufficient density to support accurate object velocity and acceleration calculation in a desired region of interest.

The control circuitry of the DFPA, in certain embodiments, is coupled to the laser transmitter and the photodetector array and comprises an array of timers associated with the array of photodetectors, where the timers are configured to measure the round-trip time of flight originating with a laser illumination pulse and terminating with a photodetector received signal to determine the range to an object of interest. In certain embodiments, the timers may also be configured to measure the difference between two or more successive round-trip ToF cycles.

Light travels at roughly 1.1 ns per foot; therefore, to measure distances to quarter inch precision, in accordance with some embodiments, the timer needs to have 21 ps (47 GHz) resolution. In certain embodiments, the timers can be implemented using high-speed digital counters. In certain embodiments, the timers leverage analog integration techniques and are coupled to an analog to digital converter (ADC) to create a digital representation of the time of flight (ToF). In certain embodiments, high-speed digital clocks are be implemented using oscillators, phase locked loops (PLLs) and/or verniers.

In certain embodiments, the digital output timer may be configured to increment in a linear fashion to measure the ToF of a detected laser pulse and, upon notification of a second laser pulse, the digital timer may be configured to decrement in a linear fashion until the second pulse is received. In this manner, the position change of detected object (detected via the returned laser pulse) is reflected in the residual timing data. In at least some embodiments, this change of position data, coupled with the time period between laser pulses, can be used to compute the velocity associated with each pixel within the region of interest or of objects of interest subtending a plurality of pixels.

In certain embodiments, the LiDAR system with integrated velocity measurement is further configured to include an additional digital timer configured as a "range gate" signal that starts a timer some time after the pulse was sent and which ends either at return pulse or max range time. The range gate signal can be used, in certain embodiments, to limit a total time of integration by delaying the timer start, and thereby ignoring return signals produced in the near field that would have required very short timing measurements to register. This technique effectively can help filter out signals and returns from objects that are not in a range of interest. The maximum detectable range may also be defined through definition of the maximum timer value. In this way all signals received after the timer has expired are ignored. In certain embodiments, these two techniques may be used in tandem to bound the minimum and maximum detectable ranges through careful definition of the minimum and maximum digital timer values.

In certain embodiments, the DFPA also comprises a digitizer array that couples an analog-to-digital-converter (ADC) to each analog timer associated with each photodetector, so that the moment a photodetector first receives a reflected light beam in response to a transmitted light pulse the digital output timer is stopped. In certain embodiments, all timing measurements are made available when the maximum timer value, corresponding to the maximum range measurement desired, is reached. The measured time is the total round-trip time that produced the reflected beam, which is proportional to twice the range to the object. Furthermore, in certain embodiments, in the simplest velocity mode, following a digital timer's increment and decrement associated with two laser pulses, a residual digital timing measurement indicative of an object's position change is digitized for each pixel of the photodetector array and made available. In acceleration mode, the rate of change of timing data from at least three illumination flashes is analyzed to produce an acceleration image. This is described further herein.

The DFPA, in certain embodiments, comprises a read-out integrated circuit (ROIC) coupled to the timer array and is configured to generate LiDAR velocity and acceleration frames based on signals received from the digital timer and illumination flash period. The read-out integrated circuit also comprises a processor and a memory coupled to the processor which is configured to execute one or more programmed instructions comprising and stored in the memory to produce a digitized LiDAR velocity image or acceleration image frame of a region of interest. Exemplary types of DFPAs, ROICs, and related circuits that are usable in accordance with at least some embodiments described herein, include, but are not limited to the following U.S. patents, each of which is hereby incorporated by reference:

U.S. Pat. No. 9,001,234, entitled "Imager Readout Architecture Utilizing A/D Converters"

U.S. Pat. No. 9,344,660, entitled "Foveal Imager Readout Integrated Circuit (ROIC)"

U.S. Pat. No. 9,369,651, entitled "Imager Readout Architecture Utilizing A/D Converters"

U.S. Pat. No. 9,595,558, entitled "Photodiode and Image Capture Methods Having a Plurality of Photodiodes with a Shared Electrode"

U.S. Pat. No. 9,787,923, entitled "Correlated Double Sampled (CDS) Pixel Sense Amplifier"

U.S. Pat. No. 9,917,592, entitled "Logarithmic Analog-to-Digital Converter Devices and Methods Thereof"

U.S. Pat. No. 10,134,799, entitled "Stacked Photodiode Multispectral Imager Having An Electrode Layer Shareable By A Non-Visible Pixel Layer and a Multicolored Pixel Layer"

At least some embodiments described herein provide a number of advantages, including providing systems, methods and devices that enable more effective and efficient object detection and object velocity and acceleration measurement for each pixel or object in the region of interest. At least some embodiments herein are usable for a variety of applications including but not limited to autonomous vehicles. In certain embodiments, a single digital focal array (DFPA) is provided that is sensitive to wavelengths in the Short-Wave Infrared (SWIR), for example 1550 nm. Such wavelengths are longer than conventional NIR LiDAR using silicon photodetectors and therefore capable of better sustaining eye safe performance in fine or inclement weather.

In at least some embodiments, a device, system and method are provided that enable a multifunction time of flight LiDAR that calculates instantaneous and average velocities and accelerations of an object of interest wherein the device includes a digital focal plane array. For example, in some embodiments, through the use of controllable transmitter repetition rates and controllable digitization of the timer arrays, novel flexibility is achieved in velocity and acceleration measurement accuracy and resolution. Furthermore, in some embodiments, novel techniques for calculating average object velocity and acceleration are introduced. Finally, in some embodiments, a novel method for digital correction of time invariant or slowly changing errors is discussed in detail.

In one embodiment, a method is provided. A first light beam is transmitted from a first location to a region of interest at a time $t_{1a}$, wherein the first light beam is configured to reflect off at least one object disposed in the region of interest to produce a first reflected light beam. A time of flight (ToF) counter is incremented until the reflected first light beam is received back at the first location. The ToF counter is stopped at a first count value when the reflected first light beam is received at the first location at a time $t_{1b}$. A second light beam is transmitted from the first location to the region of interest at a time $t_{2a}$, the time $t_{2a}$ being subsequent to the time $t_{1b}$, the second light beam configured to reflect off the least one object to produce a second reflected light beam. The ToF counter is decremented, starting from the first count value, until the reflected second light beam is received back at the first location. The ToF counter is stopped at a second count value when the reflected second light beam is received back at the first location at time $t_{2b}$. A velocity of the object is computed based at least in part on $t_{1a}$, $t_{1b}$, $t_{2a}$, and $t_{2b}$. In certain embodiments, the velocity of the object that is computed based at least in part on mathematical operations that take into account $t_{1a}$, $t_{1b}$, $t_{2a}$, $t_{2b}$, and a difference between the first count value, and the second count value.

In certain embodiments, the velocity of the object is computed solely based on $t_{1a}$, $t_{1b}$, $t_{2a}$ and $t_{2b}$.

In certain embodiments, the method includes additional operations. A third light beam is transmitted to the region of interest at a time ta, the time ta being subsequent to the times $t_{1b}$ and $t_{2b}$, the third light beam configured to reflect off the least one object to produce a third reflected light beam. The ToF counter is incremented, starting from the second count value, until the reflected third light beam is received. The ToF counter is stopped at a third count value when the reflected third light beam is received. A real-time acceleration is computed based at least in part on $t_{1a}$, $t_{1b}$, $t_{2a}$, $t_{2b}$, $t_{3a}$, and $t_{3b}$. In certain embodiments, the real-time acceleration of the object is computed solely based on $t_{1a}$, $t_{1b}$, $t_{2a}$, $t_{2b}$ $t_{3a}$, and $t_{3b}$.

In some embodiments, the light beams of the method are in the short-wave infrared (SWIR) spectrum. In some embodiments, the first light beam and second light beam have different wavelengths.

In some embodiments, the method includes, in response to transmitting at least one of the first and second light pulses, the ToF counter begins incrementing or decrementing, respectively, at least one of concurrently and after a delay.

In some embodiments, the method includes transmitting a plurality of pairs of first and second light beams at the object, wherein a frequency of transmitting the plurality of pairs of first and second light beams, is dynamically adjusted based at least in part on a detected range to the at least one object. In some embodiments, the method includes transmitting a plurality of pairs of first and second light beams at the object, wherein a frequency of transmitting the plurality of pairs of first and second light beams, is dynamically adjusted based at least in part on the velocity of the object.

In certain embodiments, the object has a size and the ToF counter has a maximum value for at least one of incrementing and decrementing, wherein the maximum value is dynamically determined based at least in part on at least one of the size, range, velocity, and acceleration of the object. In certain embodiments, the method is configured to operate a light detection and ranging (LiDAR) device comprising a transmitter for transmitting the first and second light beams, a digital counter configured as the ToF counter, a photodetector array for receiving the reflected first and second light beams, and a controller for determining the object velocity, the controller in operable communication with the transmitter, digital counter, and photodetector array.

In another aspect, a device is provided, comprising a transmitter, at least one photodetector, a counter, and a controller. The transmitter is configured to transmit one or more sequential beams of light to a region of interest, the one or more sequential beams of light configured for reflecting off at least one object disposed in the region of interest. The at least one photodetector is configured for receiving one or more reflected beams of light, the one or more reflected beams of light corresponding to the one or more sequential beams of light after reflecting of the at least one object. The counter is configured to track a time of flight (ToF) interval corresponding to the time between when a given light beam is transmitted by the transmitter, reflected off the object, and then received back at the photodetector. The controller is in operable communication with the transmitter, photodetector, and counter and is configured to perform several operations. One operation causes the transmitter to transmit a first light beam from a first location to the region of interest at a time $t_{1a}$, wherein the first light beam is configured to reflect off at a first object disposed in the region of interest to produce a first reflected light beam. Another operation increments the ToF counter until the reflected first light beam is received back at the first location. A further operation stops the ToF counter at a first count value when the reflected first light beam is received at the first location at time $t_{1b}$. Still another operation causes the transmitter to transmit a second light beam from the first location to the region of interest at a time $t_{2a}$, the time $t_{2a}$ being subsequent to the time $t_{1b}$, the second light beam configured to reflect off the first object to produce a second reflected light beam. A further operation decrements the ToF counter, starting from the first count value, until the reflected second light beam is received back at the first location. Another operation stops the ToF counter at a second count value when the reflected second light beam is received back at the first location at time $t_{2b}$. Another operation computes a real-time velocity of the first object based at least in part on $t_{1a}$, $t_{1b}$, $t_{2a}$, and $t_{2b}$.

In certain embodiments, the controller is configured to compute the real-time velocity of the first solely based on $t_{1a}$, $t_{1b}$, $t_{2a}$, and $t_{2b}$. In certain embodiments the controller is further configured to cause the transmitter to transmit a third light beam to the region of interest at a time $t_{3a}$, the time $t_{3a}$ being subsequent to the times $t_{1b}$ and $t_{2b}$, the third light beam configured to reflect off the first object to produce a third reflected light beam; increment the ToF counter, starting from the second count value, until the reflected third light beam is received, stop the ToF counter at a third count value when the reflected third light beam is received at time $t_{3b}$; and compute a real-time acceleration of the first object based at least in part on $t_{1a}$, $t_{1b}$, $t_{2a}$, $t_{2b}$, $t_{3a}$, and $t_{3b}$.

In certain embodiments of the device, the real-time acceleration of the first object is computed solely based on $t_{1a}$, $t_{1b}$, $t_{2a}$, $t_{2b}$, $t_{3a}$, and $t_{3b}$. In certain embodiments of the device, the light beams are in the short-wave infrared (SWIR) spectrum. In certain embodiments of the device, the first light beam and second light beam have different wavelengths.

In certain embodiments of the device, the controller is further configured so that, in response to transmitting at least one of the first and second light pulses, the controller causes the ToF counter to begin incrementing or decrementing, respectively, at least one of concurrently and after a delay. In certain embodiments of the device, the controller is further configured to cause the transmitter to transmit a plurality of pairs of first and second light beams at the object, wherein the controller dynamically adjusts a frequency of transmitting the plurality of pairs of first and second light beams, based at least in part on at least one of a detected range to the first object and the velocity of the first object.

In certain embodiments of the device, the object has a size, the ToF counter has a maximum value for at least one of incrementing and decrementing, and the controller dynamically determines the maximum value based at least in part on at least one of the size, range, velocity, and acceleration of the first object.

Details relating to these and other embodiments are described more fully herein.

BRIEF DESCRIPTION OF THE DRAWINGS

The above and further advantages may be better understood by referring to the following description in conjunction with the accompanying drawings, in which like numerals indicate like structural elements and features in various figures. Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification to provide context for other features. For clarity, not every element may be labeled in every figure. The drawings are not necessarily to scale, emphasis instead being placed upon illustrating embodiments, principles, and concepts. In the drawings:

DETAILED DESCRIPTION

Figure 1:
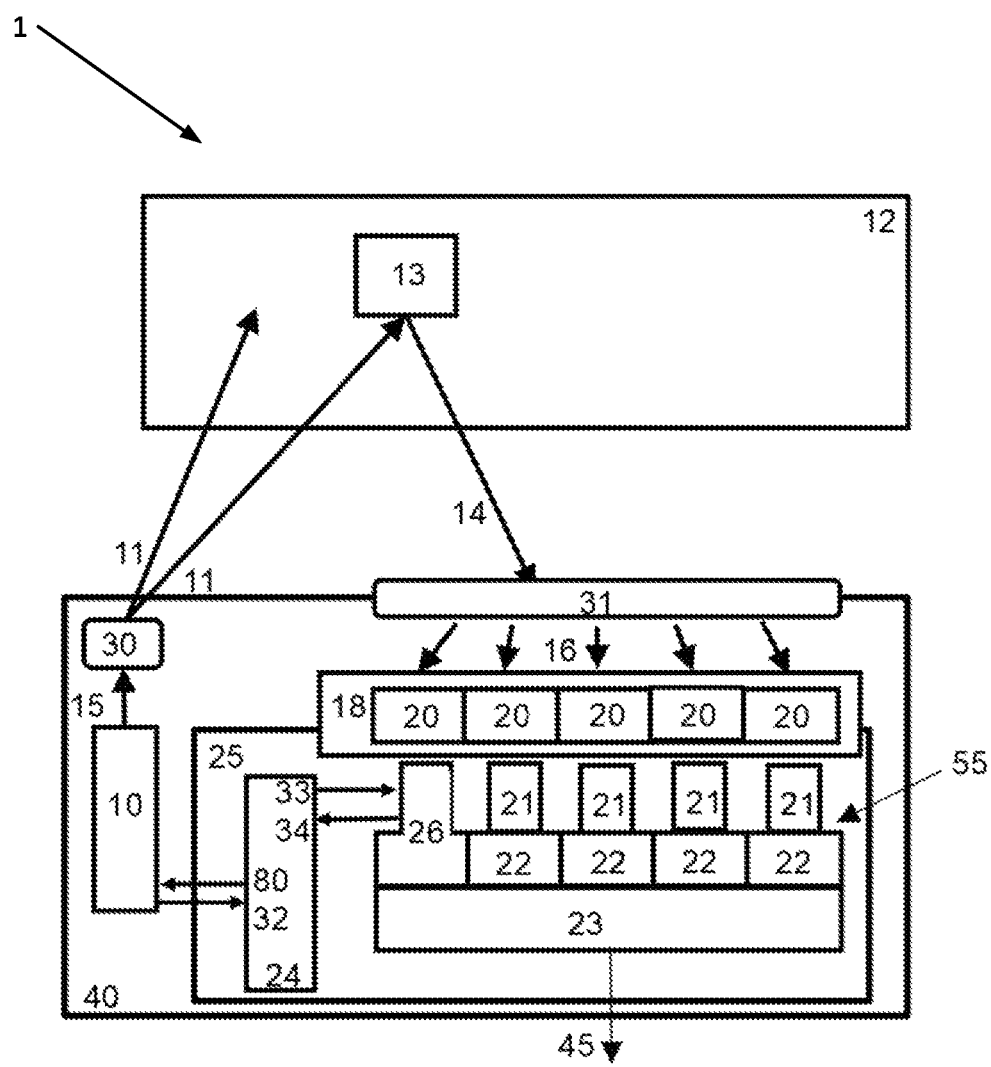
FIG. 1 is a first block diagram including a first exploded schematic view of a first exemplary LiDAR device and an object of interest to be imaged, along with an exemplary an environment in which they operate, in accordance with one embodiment.

At least some illustrative embodiments will be described herein with reference to exemplary LiDAR apparatuses, devices, systems, and methods. It is to be appreciated, however, that embodiments described herein are not restricted to use with the particular illustrative system and device configurations shown. In addition, embodiments can include, without limitation, apparatus, systems, methods, and computer program products comprising processor-readable storage media configured to implement some or all processes and/or functions described herein.

Before describing embodiments of the concepts, structures, and techniques sought to be protected herein, some terms are explained, and some relevant background patents are referenced. The following description includes several terms for which the definitions are generally known in the art. However, the following glossary definitions are provided to clarify the subsequent description and may be helpful in understanding the specification and claims.

As used herein, the term "LIDAR system" broadly includes at least any system that can determine values of parameters indicative of a distance between a pair of tangible objects, or the depth of a region within a tangible object, whether or not either of the objects in the pair is moving, based on reflected light. The tangible objects can be any type of entity or thing that light can reflect off of, whether fixed or movable, solid or liquid, including but not limited to humans, animals, reptiles, birds, vehicles (including those traveling on land, in the air, in space, and in or on water), water and other liquids, both in solid and liquid form, buildings, structures, plants, inanimate objects (whether natural or man-made), objects under automated and/or remote control, and/or objects under control of a person.

In at least some embodiments, at least some of the LIDAR systems described herein are configured to determine a distance between a pair of tangible objects, determine a direction of travel of one or more tangible objects, determine a velocity of one or tangible objects, and/or determine an acceleration of one or more tangible objects, based on reflections of light emitted by the LiDAR system, where the range, velocity and acceleration determinations can be absolute or relative and can broadly include generating outputs which are indicative of at least one or more of distances between pairs of tangible objects, velocity of one or more tangible objects, and/or acceleration of one more tangible objects (including negative acceleration).

The measured or determined distance, also referred to herein as linear dimensions, may represent the physical dimension between a pair of tangible objects, including but not limited to a line of sight distance between the LIDAR system and another tangible object in a field of view of the LIDAR system. In at least some embodiments, an output indicative of distance, velocity, speed, and/or acceleration can be provided in the form of, for example, standard length units (e.g., meters, inches, kilometers, feet, and the like) and temporal units (e.g., seconds, milliseconds, and the like), a ratio between the distance and another known length; spanning a duration of time. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects, including as a ratio (e.g. number of meters, number of inches, number of kilometers, number of millimeters), a unit of time (e.g. given as standard unit, arbitrary units or ratio, for example, the time it takes light to travel between the tangible objects), specified using a predetermined coordinate system, specified relative to a known location, etc.

In at least some embodiments, a "light source" broadly refers to any device configured to emit light, including but not limited to lasers such as gas lasers, laser diodes, solid-state lasers, high power lasers, and the light can be emitted in many different spatial and temporal formats, including but not limited to pulses (including short pulses having detectable rise and fall times), continuous waves (CW), bursts, organized point clouds, random spatial patterns, etc. In some embodiments, the emitted light is at a wavelength between about 650 nm and 1150 nm. Alternatively, the light source may include a laser diode configured to emit light at a wavelength between about 850 nm and about 1050 nm (NIR), or between about 1300 nm and about 1600 nm (SWIR).

The term "Time of Flight," (ToF) in at least some embodiments herein, refers at least to a period of time between the emission of a light signal (also referred to herein as a light beam) from a source, the light beam striking the tangible object, and its return for detection by the sensor. In some embodiments, the sensors of the LiDAR system convert the received signal into temporal information indicative of ToF. For example, by using known information (such as the speed of light in the medium of travel, e.g., air), the ToF information is processed to generate information about a distance the light signal traveled between emission and detection.

At least some conventional LiDAR systems must read out and post process two successive range maps to derive velocity data and must read out and post process three or more successive range maps to derive acceleration data. In contrast, at least some embodiments described herein provide systems, methods, and apparatuses configured to output a velocity image or acceleration image directly. In certain embodiments, through use of an innovative digital timer configuration, velocity amplitude (speed) is translated to image intensity, facilitating simple and efficient processing of various measurements. For example, in one embodiment, the digital timer configuration, including translating velocity amplitude to image intensity, enables quick determinations using thresholds, such as an amplitude threshold or a speed or velocity threshold, which may be applied to the whole region of interest or a portion of the region, to detect or reject all objects above or below a prescribed, predetermined threshold (e.g., a predetermined velocity threshold). In one embodiment, a velocity threshold is applied to at least one of a velocity map of the region of interest and a velocity measurement of an object.

Further, the use of the digital timer configuration described above and further herein also may be applied to acceleration data within an acceleration image. The embodiments described further herein, for incrementing and decrementing the digital timer, afford in at least some embodiments, a LiDAR flexibility that is novel. By way of example and not limitation, in at least some embodiments, the LiDAR may be configured to detect only objects within a prescribed range and in excess of a prescribed velocity. As those of skill in the art will appreciate, at least some of the exemplary embodiments described herein may be extended to include two or more ranges and two or more object velocity constraints, and it also can be extended to many applications. For example, in an autonomous vehicle application, the LiDAR may be configured to detect objects within a relative close region of interest that exceed a prescribed speed and direction that may require immediate evasion action, whereas objects detected in a more distant region may be detected at a higher prescribed speed and direction to allow for events to further develop before committing to a path change. In another example, only objects that exceed a deceleration threshold in the nearfield may create an alert.

In at least some embodiments, apparatuses are provided that include a read out integrated circuit (ROIC) that includes in-system configurable optimizations to create a multifunctional DFPA capable of operating in traditional "flash" LiDAR imaging mode, in a novel "flash" Light Detection And Velocity (LiDAV) imaging mode, and/or in a novel "flash" Light And Detection Velocity and Acceleration (LiDAVA) imaging mode, or in any combination thereof.

As described further herein, in one embodiment, an object's velocity is determined through two successive illuminations of the region of interest, where the digital timer increments in a constant digital step size with the commencement of the first illumination pulse and stops incrementing upon a detection of the first reflected beam. The digital timer decrements in the same constant digital step size with the commencement of the second illumination pulse, the timer and stops decrementing upon detection of the second illumination beam. The status of the digital timer is then digitized and used to calculate velocity when combined with the roundtrip time of each transmitted pulse.

Turning now to the drawings, in which like reference characters indicate corresponding elements throughout the several views, attention is first directed to FIG. 1, which FIG. 1 is a first block diagram including a first exploded schematic view 1 of a first exemplary LiDAR device 40 and an object of interest 13 to be imaged, along with an exemplary environment in which they operate, in accordance with one embodiment. FIG. 1 illustrates a LiDAR region of interest 12 including an object of interest 13. The LiDAR device 40 embodies at least some advantageous and at least some inventive principles and features and is described further below.

This exemplary LiDAR unit 40 can produce ToF three-dimensional (3D) range information, ToF 3D velocity cloud information and ToF 3D acceleration information, as described further herein. The LiDAR unit 40 includes, in certain embodiments, an illumination source 10, collecting optics 31, a detector array 18 (which includes one or more LiDAR photodetectors 20), and a digital focal plane array 25. Each of these is described further below.

The illumination source 10 is configured to provide a source of light that is distributed over a region of interest 12. In this example embodiment, the illumination source 10 is an infrared laser configured to provide a source of light in the short-wavelength infrared radiation (SWIR) band, i.e., radiation at wavelengths between 1.4 µm-3 µm, although the illumination source 10 may also provide radiation at other wavelengths, and this set of wavelengths is not limiting. SWIR is utilized in this example as longer wavelengths require thicker absorbers and become unattractive for high frame rate flash LiDAR. In certain embodiments, if it is known that certain features (e.g., water) may be present in the region of interest 12, then the laser wavelengths can be selected to compensate for and/or work with those features. For example, if water is present in the region of interest, it is known that wavelengths less than 1.4 µm are highly reflected by water, which may be present within the region of interest and therefore present specular reflections, scatter or absorption that may degrade optical system performance. Thus, advantageously, in certain embodiments, with water, other wavelengths may be preferred. For example, in one embodiment, an illumination source with a 1.55 µm wavelength is utilized for the LiDAR ToF measurement.

In one example embodiment, the illumination source 10 (also referred to herein as LiDAR transmitter 10) is a plurality of pulsed laser diodes, which allows for flash LiDAR imaging, although the illumination source 10 in other embodiment may also be a high-power erbium pulsed fiber laser, or a continuous source laser, by way of example only. The laser source(s) used as an illumination source 10 may each be processed by a discrete optical element (DOE) (30) (also referred to herein as an optical assembly 30) to generate the point cloud of spots to be received by the photodetector array. The use of flash LiDAR imaging provides for an increased number of frames per second (fps) over scanning LiDAR systems, achieving by way of example, up to 240 fps. In one example embodiment, a plurality of pulsed laser diodes is employed as the illumination source 10. In another example at least two lasers of dissimilar type, for example emitting dissimilar wavelengths, are employed and may illuminate the region of interest concurrently or sequentially. the transmitter device emits in the Short-Wave Infrared (SWIR) spectrum. In one embodiment, the transmitter device is comprised of at least two transmitters, where the at least two transmitters emit at least one of the same wavelength of light and a dissimilar wavelength of light.

In one embodiment, the transmitter emits light in at least one of a periodic frequency and an aperiodic frequency (although a periodic frequency is depicted in the figures of this disclosure). In one embodiment, in response to a detected/determined object range (range to object 13 of interest, e.g.) the transmitter 10 repetition frequency is at least one of increased and decreased. In one embodiment, in response to a detected/determined object velocity (discussed further herein) the transmitter repetition frequency is at least one of increased and decreased.

The collecting optics 31 (also referred to herein as lens 31) is positioned to receive light and focus the received reflected light 14 on the focal plane array 25 comprised of at least one photodetector 20. In this example of FIG. 1, the lens 31 is configured to receive infrared light from the shortwave band, although the lens 31 may receive other types of light. The lens 31 is positioned to collect light initiated from the illumination source 10 and reflected 14 from one or more objects of interest 13 (e.g., tangible objects) located in the region of interest 12.

The detector array 18 is positioned to receive light focused by the lens 31 onto the detector array 18. The received light includes infrared beams provided by the illumination source 10 which are reflected from the one or more objects of interest 13 in the region of interest 12. In one embodiment, as discussed further herein, a velocity image (also referred to herein as a velocity map) is calculated from a plurality of photodetectors 10 in response to at least two detections of the at least one object 13 of interest. This is discussed further herein in connection with FIGS. 5, 7, and 10.

In this example of FIG. 1, the detector array 18 is formed from a non-silicon substrate and comprises a plurality of LiDAR photodetectors 20 arranged in a two-dimensional (2D) array. The silicon detectors used in many types of LiDAR systems cannot efficiently detect wavelengths greater than 1 µm, and, therefore, laser sources of this frequency can be severely degraded by fog and snow, thereby limiting performance. An exemplary, and non-limiting, list of detector substrates that support fabrication of photovoltaic or photoconductive IR detectors, usable in at least some embodiments, includes InGaAs, GaAs, GaSb, InSb, InAs, HgCdTe, and Ge. In at least some embodiments, the use of the non-silicon materials responsive to longer-wave laser sources gives the LiDAR system vastly improved capability to penetrate fog, snow, and rain. In one example embodiment, the LiDAR detectors 20 are configured to detect reflected SWIR beams 14 that have been focused into focused beams 16.

In certain embodiments, the digital pixel architecture of the detector array 18 may provide in-pixel $\log_2$ analog-to-digital conversion (LADC) as disclosed in U.S. Pat. No. 9,917,593, the disclosure of which is incorporated herein by reference.

The digital focal plane array (DFPA) 25 is operably coupled to the detector array 18, and includes a controller 24, a digital timer 26, and a readout circuit 23. In certain embodiments the digital focal plane array DFPA 25 is shown to comprise at least one photodetector 20, at least one timer 21 associated with the at least one photodetector, at least one digitizer 22 to digitize the digital timer data and a readout circuit 23 to produce image data and metadata. The combination of the timer 21 and associated ADC 22 is referred to as a digital timer 26. The DFPA 25 further comprises a controller 24 that sends a command to the illuminator 10 and may also in return receive a confirmation command and timing mark 32 from the illuminator 10 (also referred to herein as a transmitter) that an illumination pulse has been transmitted.

In certain embodiments, the integrators in the ROIC 23 are reset for each detector in the detector array 18 in the frame. The detector array 18 is then configured for the ToF LiDAR measurement, before a light pulse or ping is initiated from illumination source 10. In one example embodiment, a mechanism may be located on the DFPA 25 to initiate the light pulse. The ping may be initiated on the ROIC 23 and signal the illumination source 10. In one example embodiment, the illumination source 10 includes a sense output (not shown) to more accurately indicate when the pulse is fired. The sense output, in certain embodiments, is fed back to the ROIC 23 to better control the start of ToF timing. In one embodiment, the DFPA 25 may include a device that generates the ping and sends the ping to both the illumination source 10 and the ROIC 23 in parallel. In one example embodiment, a 1 ns ping pulse width, with an end ToF window of 1 μS and a 13-bit ADC, yields a 1-inch resolution from 1 to 500 feet. The temporal span defined by the start and end of the ToF window corresponds to a region of interest distance span or "range gate" over which the ToF measurement is responsive.

Referring again to FIG. 1, in one example, the detector array 18 is specifically designed to be broadband from 850 nm to 3000 nm. This enables the DFPA 25 to work with multiple laser illuminators 10 and to be optimized per application by the addition of optical filter coatings on the lens 31. In one embodiment, the LiDAR transmitter 10 emits a flash of illumination 15. Unlike "scanning" LiDAR, flash LiDAR mode may use a 1 ns to 4 ns pulse width "flash" from a pulsed laser 10 to illuminate the region of interest 12 and measure the ToF back to each pixel concurrently.

The illumination 15 is conditioned by an optical assembly 30 to project the singular incident beam 15 as a plurality of beams 11 incident on the region of interest 12. In certain embodiments, the optical assembly 30 is, by means of example and not limitation, a Discrete Optical Element (DOE) that defines the number of exiting beams and the two-dimensional angle of each beam, so that a predetermined pattern of beams 11 is spatially dispersed throughout the region of interest 12. At least one incident beam strikes an object of interest 13 and the reflected beam 14 returns to the LiDAR device 40.

The at least one reflected beam 14 is coupled to the LiDAR 40 with an optical assembly 31 comprising at least one optical element and is focused 16 onto the at least one photodetector 20. The arrival of the focused reflected beam 16 is sensed by the photodetector 20 and the measured time 55 between the transmitted laser flash 15 and the detected return signal 16 is quantified in the timer 21 and digitized by a dedicated ADC 22 for each photodetector and timer pair. Finally, the timing data 55 of each combination of photodetector 20 and digital timer 26 is formatted for readout as a range map 45 by the readout circuit 23.

Figure 2:
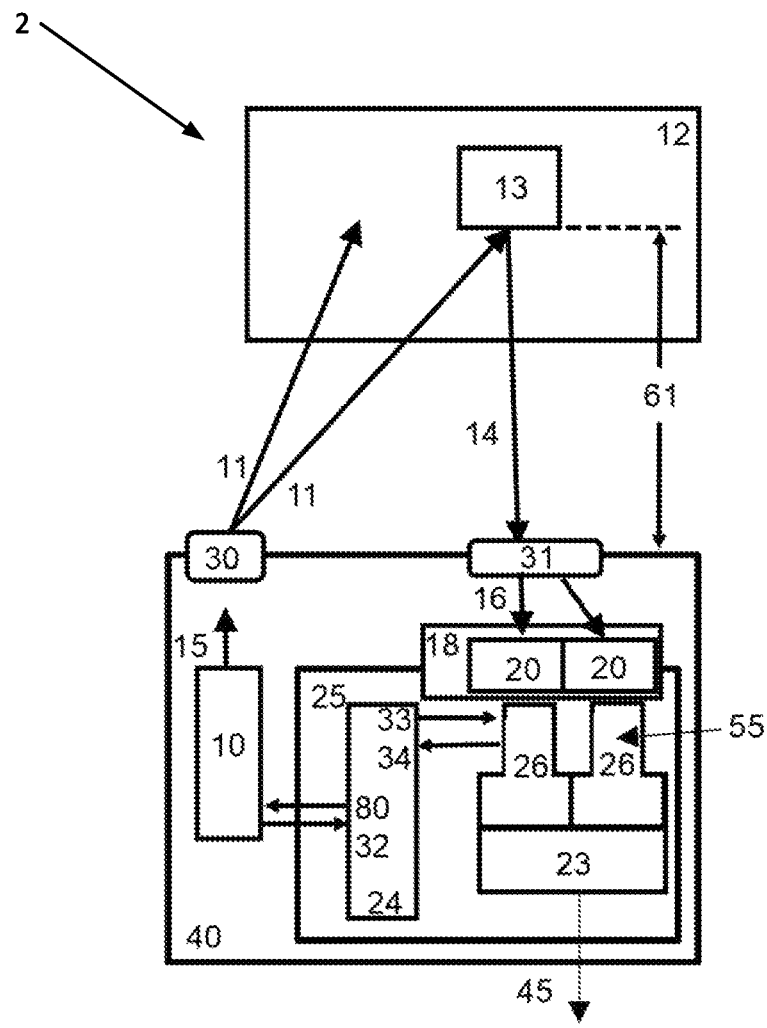
FIG. 2 is a second block diagram including a second exploded schematic view of a second exemplary LiDAR device and an object of interest at a distance from the LiDAR device; and a digital timer status correlated to the object distance, in accordance with one embodiment.
Figure 3:
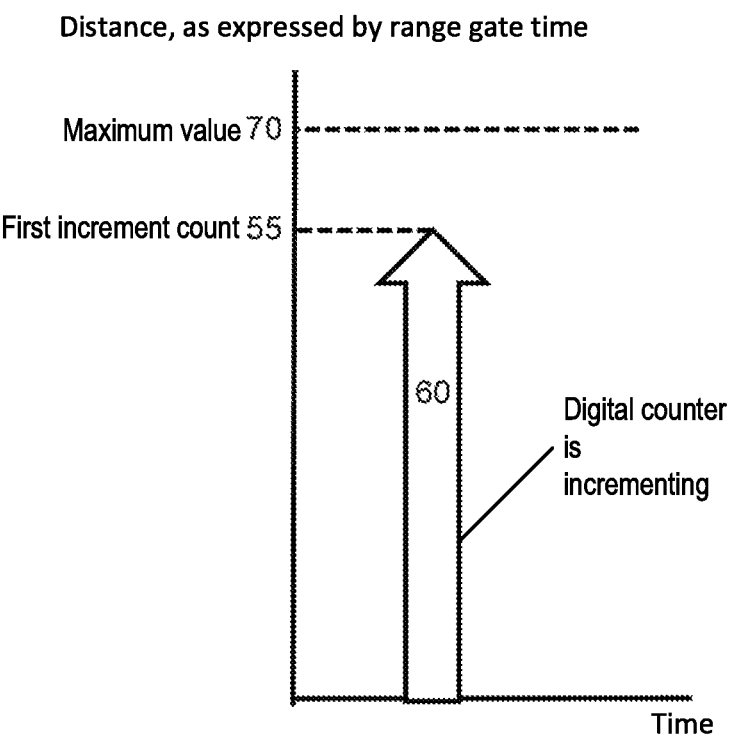
FIG. 3 is a first illustrative graph depicting a first digital timer status, correlated to object distance, for the second exemplary LiDAR device of FIG. 2, in accordance with one embodiment.

FIGS. 2 and 3, together, illustrate in detail the how a range map 45 is calculated using in the simplest example a single laser flash detected by a photodetector within the DFPA. FIG. 2 is a second block diagram 2 including a second exploded schematic view of a second exemplary LiDAR device and an object of interest at a distance from the LiDAR device. The second block diagram 2 is substantially similar to the first block diagram 1 of FIG. 1, but in smaller scale. FIG. 3 is an illustrative graph depicting a first digital timer status, correlated to object distance, for the second exemplary LiDAR device of FIG. 2, in accordance with one embodiment.

It will be understood that the sequence described herein applies to all photodetectors and digital timers resident on the DFPA 25, and it is further understood that a high-density two-dimensional array will yield superior range maps and velocity maps to sparsely populated arrays. In addition, at times reference is made briefly to FIG. 10, which is a first timing diagram 1000 showing actions in the systems of FIGS. 1-7, where this timing diagram 1000 also can illustrate portions of the actions also shown in digital timer status graphs of FIGS. 3, 5, and 7. It will be appreciated that FIG. 10 depicts, for illustrative purposes only, many signals showing, effectively, "instantaneous" rise and fall times, without jitter, settle and hold time, actual measurable rise and fall times, etc., but one of skill in the art will appreciate that, in real-world devices, such factors can be present in an actual timing diagram.

Figure 10:
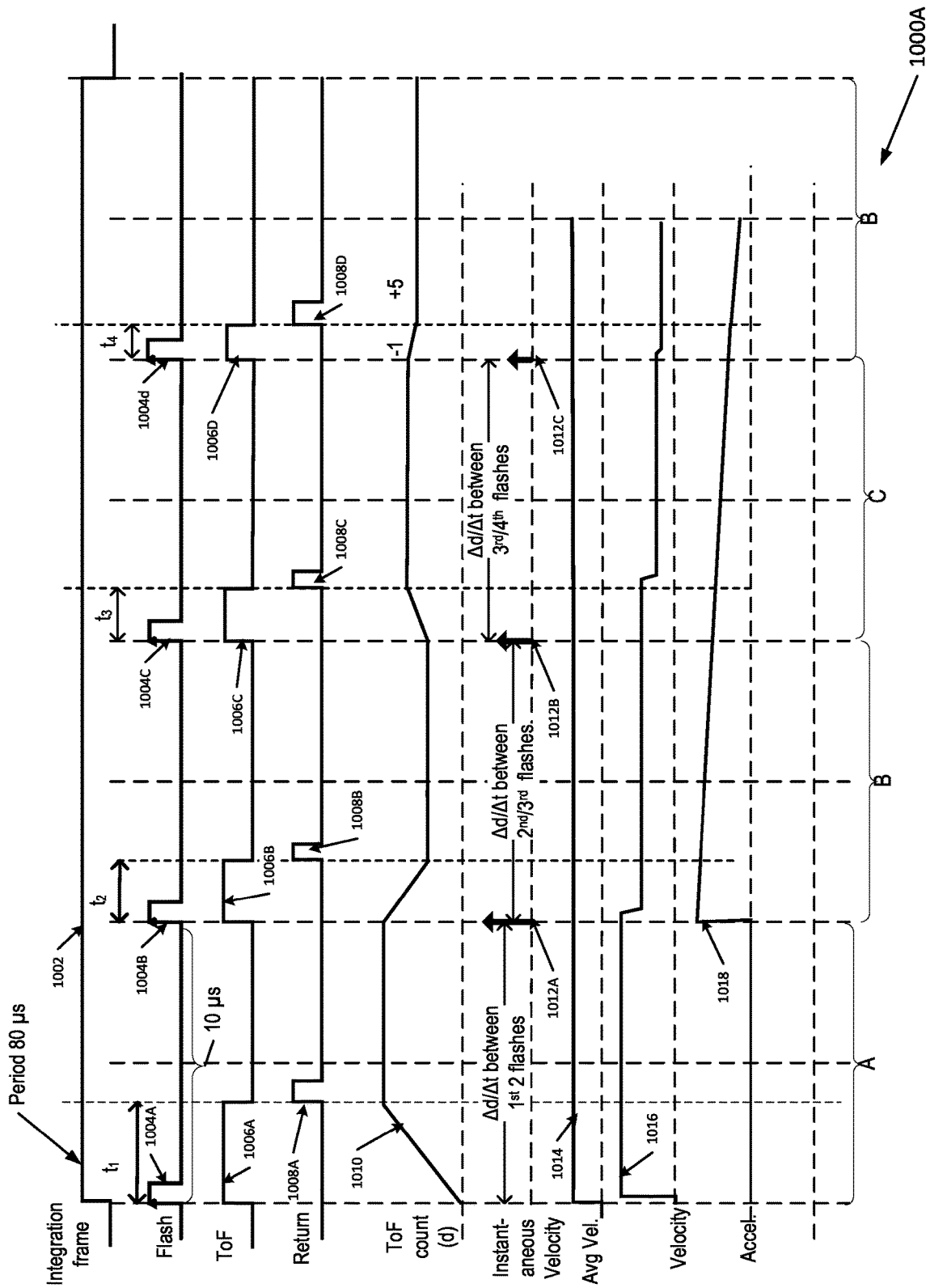
FIG. 10 is a timing diagram showing actions in the system of FIGS. 1-7 when the methods of FIGS. 8 and 9 are implemented.

Referring to FIGS. 1-3 and 10, an exemplary sequence begins with the controller 24 sending a command trigger 80 to the laser transmitter 10 to induce a transmitted laser pulse 15 (which is shown in FIG. 10, for example, as the first flash pulse 1004A). In one example, when the "flash ping" (also referred to herein as flash pulse) 1004A is detected by an internal optical pickoff, a digital range gate start (RGS) trigger counter is started. That is, the digital RGS counter is started, in certain embodiments, essentially concurrently with the flash pulse 1004a. In another example, the RGS trigger is started based on an electronic signal, such as a signal sent to the illumination source 10, such as a laser, to commence an output pulse. In the timing diagram 1000A of FIG. 10, the start of the integration frame 1002 corresponds to the initiation of the range gate trigger. When the RGS 1002, asserts, the digital timer 26 is turned on, and stays on, until the return pulse 14 is detected. For example, in the timing diagram of FIG. 10, the signal 1006 labeled "ToF" corresponds to the digital timer signal, and the portion 1006A of this signal corresponds to the state of this signal after the flash 1004A is sent, wherein it stays high until the return 1008A is detected. The ToF count 1010 is a signal that linearly tracks the count made by the digital timer 26. In certain embodiments, the controller 24 keeps track of the ToF count 1010. In at least one embodiment, the digital timer 26 increments and decrements in discrete steps that are at least one of constant in step size and constant rate of change in step size and comply with a curvilinear rate of change in step size. Although the timing diagram of FIG. 10 depicts the digital timer 26 starting to mark time at substantially the same time as (i.e., substantially concurrently with) the flash 1004 that takes place, in some embodiments, the timer can begin marking time after a delay, e.g., a predetermined delay. This is discussed further herein in connection with FIG. 8.

The error integrator amplifies the incoming signal, and when it detects the reflected ping (e.g., the return 1008A), that photodetector 20 or pixel integration is halted. At the end of a range gate window, all integration is halted, regardless of whether the reflected ping 1008 was detected, and the state of the digital timer 36 is, in this example for linear timer increment, linearly proportional to the ToF for that pixel. This is depicted in the timing diagram of FIG. 10 in the ToF count 1010, wherein, at the time the return 1008A is received, the value of the ToF count 1010 is shown as having been linearly incrementing. The range gate/integration frame 1002 start and end time may be optimized to extend the total operational range of the integrated LiDAR 40. In the example of FIG. 10, it is a total time of 80 µs, but this is not limiting. Each sub interval A, B, C, D, labeled in FIG. 10 corresponds to 20 µs. In some embodiments, the maximum value of the digital timer 26 can vary based on region of interest. For example, in one embodiment, the digital timer 26 has at least two dissimilar maximum values each corresponding to a dissimilar maximum range corresponding to the farthest border of the region of interest.

The maximum count of the digital timer 26 also can vary based on the detected object 13 itself and/or characteristics of the detected object 13. In one embodiment, in response to a detected object the maximum value of the timer prior to digitization is at least one of increased and decreased. That is, in one frame or series of frames. an object may be detected that warrants further scrutinization. Thus, in some embodiments, the minimum and maximum values of the timer can be adjusted to "box in" the object of interest to enable taking a closer look at that object for a frame or several frames, and then normal operation can be resumed.

Referring again to the example embodiment of FIG. 2, the laser transmitter 10 is of the type that internally senses by means of an internal photodetector (not shown) the moment a beam 15 is output and sends a confirmation timing mark 32 back to the controller. As one of skill in the art will appreciate, other means may be used as well; for example, purely electronic timing signals. Upon receiving confirmation 32 the laser transmitter 10 has emitted a laser pulse 15, the controller 24 sends a command 33 to the digital timer 26 to begin marking time, in this example by means of incrementing the digital timer 26. The graph 3 of FIG. 3 shows time vs distance (where distance can be expressed in a time-like format, such as a range gate count), and FIG. 3 illustrates, in one embodiment, that this progressive temporal measurement comprises incrementing 60 (shown by the arrow labeled "60" that is pointing in an upwards direction) to a value of 55. The digital timer 26 will continue incrementing/counting upwards until commanded to stop or until it has reached the timer maximum value. The graph of FIG. 3 for the digital timer 26 shows a maximum value line 70 that corresponds to the maximum range (which could be any value) at which the LiDAR can detect objects.

An actual maximum value of the maximum value 70 would, in certain embodiments, be the maximum allowed by the ADC, unless the system were operating in a range gating mode. In this example of FIG. 3, the timer value incremented to is shown by the first increment count line 55 and corresponds to the object of interest distance from the LiDAR 61.

While the digital timer 26 is counting time via the first upward count 60, the transmitted beam 15 exits the LiDAR 40 through the exit optics 30 as at least two light beams 11 directed in a pattern determined by the exit optics 30 at the region of interest 12. An object of interest 13 is struck by at least one light beam and the reflected beam 14 is coupled back into the LiDAR 40 by the collecting optics 31. The return beam 14 is conditioned and focused by the collecting optics onto at least one photodetector 20. The photodetector 20 senses the arrival of the reflected beam 14, in this example by means of detecting the leading edge of the rising photocurrent generated in response to the incident beam 16 (e.g., by detecting the leading edge of the return pulse 1008A of FIG. 10). Upon detection of the received beam 14, the photodetector 20 induces the coupled digital timer 26 to stop counting, in this example to stop incrementing. This is also depicted in the timing diagram of FIG. 10 by the ToF count 1010, in subsection A, as stopping its linear increase, coincident with the rising edge of the return 1008A. The digital timer 26 in turn informs the controller 24, e.g., via a signal or command 34, that the transmit and receive cycle is complete. It will be understood that this example is to illustrate the embodied concepts and for example the photodetector 20, or another component, may also send or provide notification to the controller 24 and the digital timer 26 of the received beam (i.e., the return 1008A).

Referring again to FIGS. 2, 3, and 10A, the time elapsed for the emitted beam 15 to reflect from the object of interest 13 and return to the LiDAR device 40 is correlated to the maximum incremented value 55 of the incrementing digital timer 60 and correlates directly with the distance 61 (FIG. 2) (e.g., linear distance) of the object 13 of interest to the LiDAR 40. The digitized measurement 55 is output via the readout circuit 23, in this example provided as a range in linear dimensions 45, which can be calculated in the readout electronics with knowledge of the temporal measurement 55. It will be understood that the DFPA 25 is envisaged to comprise many photodetectors and digital timers in a dense two-dimensional array, and the simplified illustrations in FIGS. 1, 2, 4, and 6, are provided for simplified examples.

Figure 4:
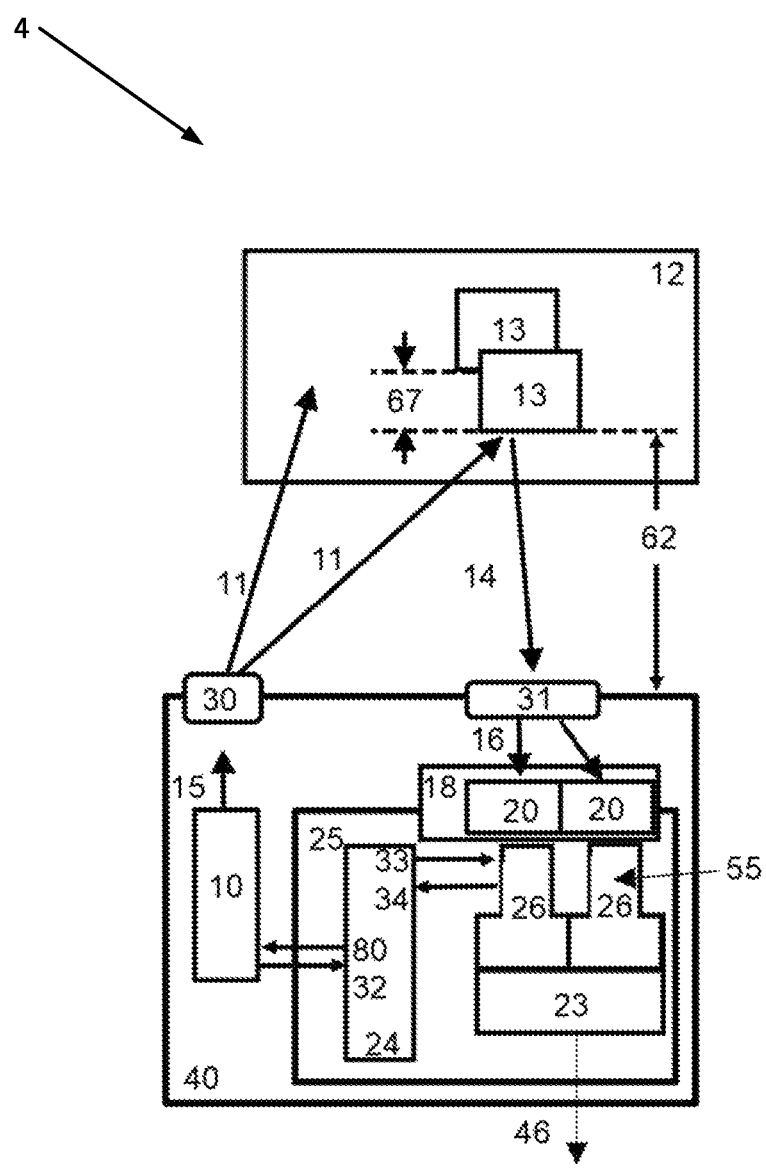
FIG. 4 is a third block diagram, including an exploded schematic view of a third exemplary LiDAR device, showing an object of interest that has moved to a new distance from the LiDAR device during two illumination cycles, in accordance with one embodiment.
Figure 5:
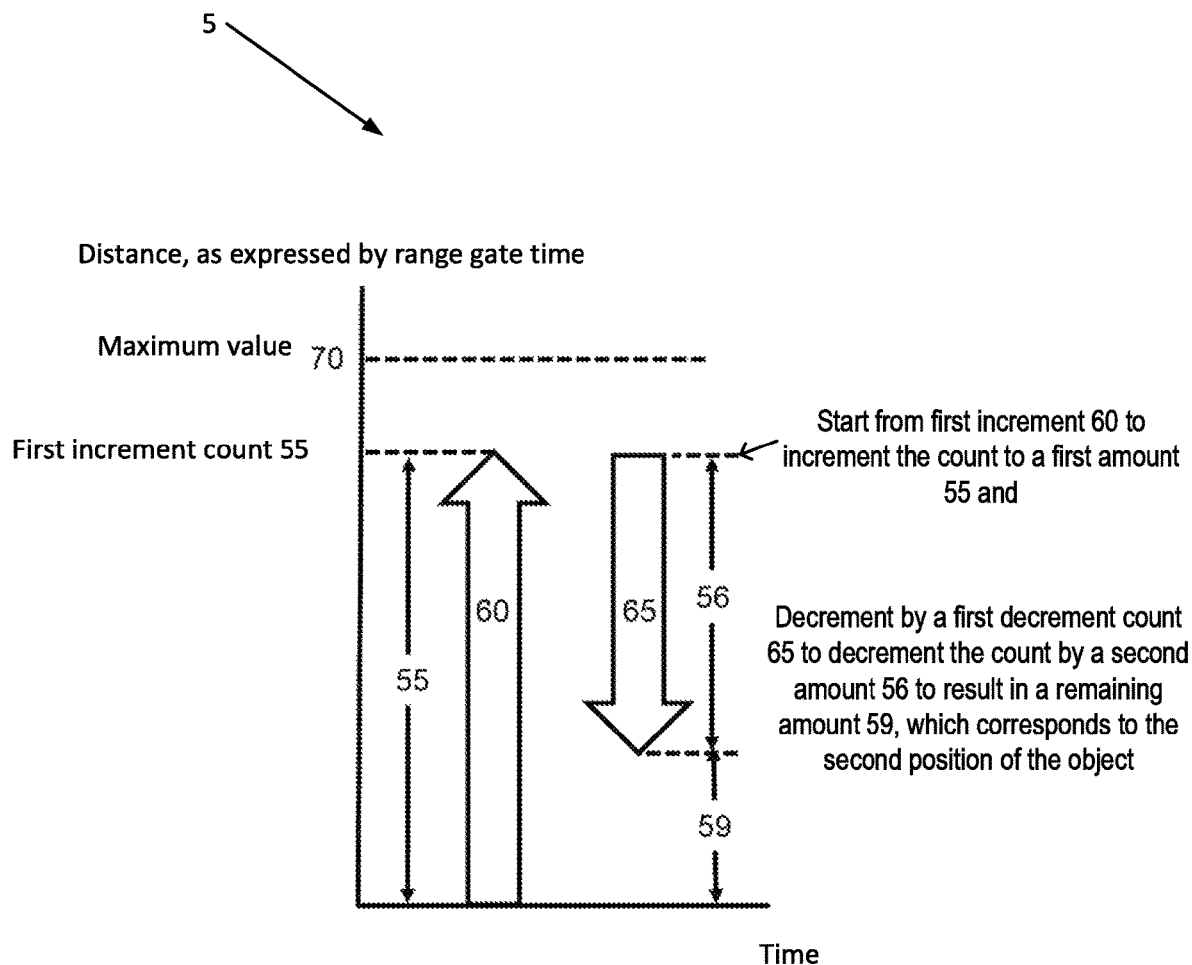
FIG. 5 is a second illustrative graph depicting a second digital timer status correlated to the new object distance of FIG. 4, in accordance with one embodiment.

FIG. 4 is a third block diagram 4, including an exploded schematic view of a third exemplary LiDAR device 40, showing an object of interest 13 that has moved to a new distance from the LiDAR device during two illumination cycles, in accordance with one embodiment (e.g., the object 13 has moved to a new position that is a new distance 62 relative to the LiDAR device 40, where the object traveled a distance 67 to do so. FIG. 5 is a second illustrative graph 5 depicting a second digital timer status correlated to the new object distance of FIG. 4, in accordance with one embodiment.

Referring to FIGS. 4, 5, and 10, these figures illustrate in detail the how various dimensional and three dimensional velocity maps 46, 610, 614 (see, e.g., FIGS. 6B-6F) are calculated using, in the simplest example, at least two successive laser flashes detected by at least one photodetector 20 within the DFPA 25 (other examples include three and four successive flashes, as discussed further below). This also is depicted in the timing diagram 1000A of FIG. 10, via the first flash 1004A, second flash 1004B, first ToF 1006A, second ToF 1006B, first return 1008A, second return 1008B, and the linear ToF count 1010 showing the first linear incrementing at the start of interval A, up to the first return 1008A, and the second linear decrementing of the ToF count 1010 at the start of interval B, running up to the second return 1008B, as explained further below.

Referring again to FIGS. 4, 5, and 10, building on the previous example, after the first position of the object of interest 13 resulting in the digital timer 26 incrementing 60 to a maximum value labeled as 55 (FIG. 5) that correlates to the initial distance of the object from the LiDAR device 40, the object 13 of interest moves towards the LiDAR device 40 by a distance 67 to a range 62 from the LiDAR, as shown in FIG. 4. Note that the "67" refers to the reference number of the distance and not necessarily an actual distance measurement; similarly, the range 62 is the reference number for the term "range" and not an actual range.

A second laser pulse is emitted (e.g., the second flash 1004B of FIG. 10) and the return 1008B detected with the same sequence of steps outlined above, in connection with FIGS. 1-3, to determine the initial object of interest range, but with the second laser pulse 1004B, the digital timer 26 is commanded to mark time by decrementing 65 units from the maximum value of 55 units achieved by the first sequence of steps beginning with the first laser pulse. An example of decrementing in the count is shown, for example, in the decreasing linear slope of the ToF count 1010 at the start of interval B in FIG. 10. The timer 26 will continue to decrement until the second laser pulse 15 is reflected from the object of interest 13, now displaced by a displacement value 67, and the reflected beam 14 is coupled through the collecting optics 31 to a photodetector 20 that senses the rising edge of accumulating photocurrent (e.g., in second return 1008B) and signals the digital timer to stop decrementing 65 the time measurements. The digital timer 26 will now hold a new value 59 that results from the maximum time increment 55 of the object's original position being decremented, as shown by decrement arrow 65 by the maximum time decrement 56 corresponding to the object's new position 62. Thereby the digital timer 26 value 59 corresponds to the object's change in position 67 during the time period between laser illumination flashes. The example illustrates the object moving closer to the LiDAR device by a distance 67 so that maximum time increment 55 minus the maximum time decrement 56 is a positive value 59, but also applies to an object that has moved farther away in which case for example the digital timer would indicate a negative value.

The LiDAR device 40 is now in possession of a measurement 59 that correlates to the linear displacement 67 of the object of interest 13, and the t timing difference between verified laser source 10 flashes 1004A, 1004B, as reported by the two flash verification signals 32, where the timing difference ($\Delta t$) starts with the leading edge of the first flash and ends with the detection of the second flashes. Thus, the LiDAR timing measurement for range D is from the start of the flash until the received signal is detected.

Thus, the ROIC 23 computes the velocity of the object 13 as perceived by a photodetector 20 by comparing the object displacement and time elapsed during displacement. To compute velocity, this is done twice to get two range measurements. Then, the velocity is the range difference ($\Delta D$) divided by the timing difference ($\Delta t$), where, as noted above, ($\Delta t$) starts with leading edge of first flash and ends with detection of second flash. For example, in FIG. 10, the timing diagram 1000A depicts a first instantaneous velocity 1012A computed based on $\Delta d/\Delta t$, where $\Delta d$ is the difference between the distance corresponding to the rising/leading edge of the first flash 1004A and the distance corresponding to the detection of the second flash 1004B, and $\Delta t$ is the time spanning from the start (rising/leading edge) of the first flash to the detection of the second flash. The timing diagram 1000A also depicts a second instantaneous velocity 1012B computed based on $\Delta d/\Delta t$ between the beginning of the second flash 1004B and the end of a third flash 1004C, and a third instantaneous velocity 1012C computed based on $\Delta d/\Delta t$ between the third flash 1004C and a fourth flash 1004D.

In one embodiment, a calculated average velocity is calculated from at least one of sequential light beams and non-sequential light beams.

Figure 6A:
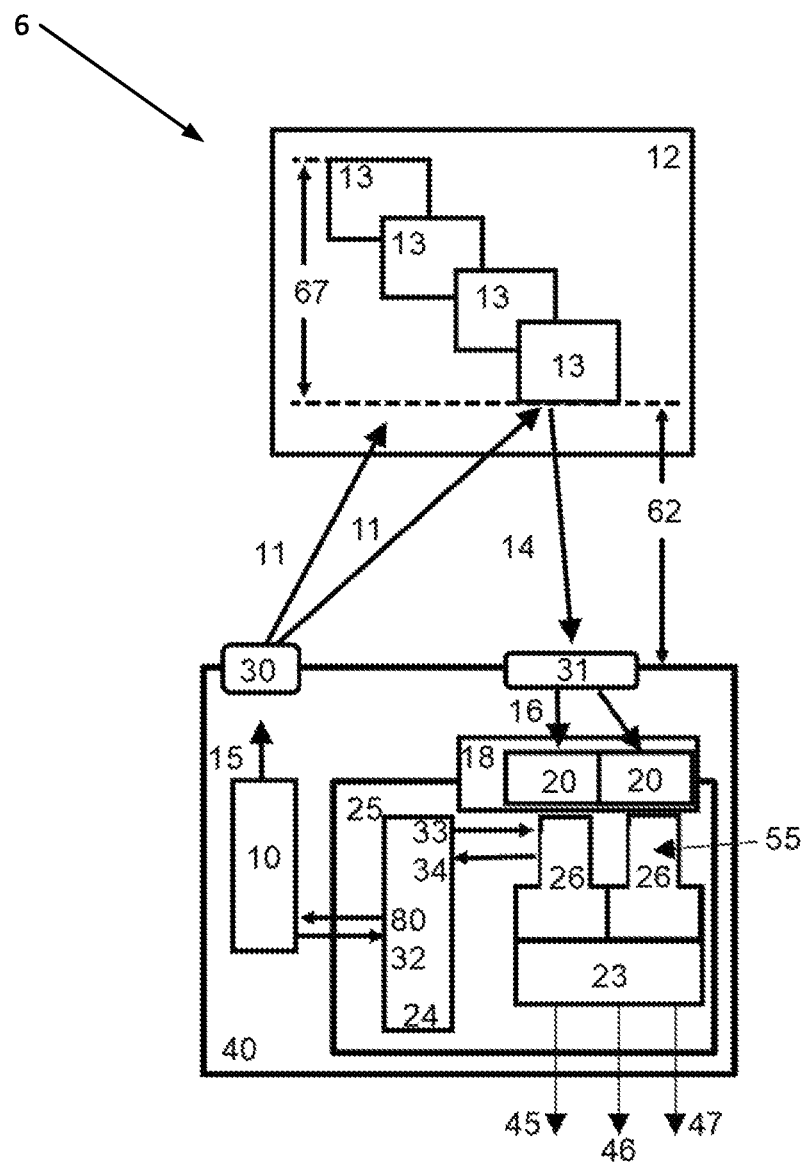
FIG. 6A is a fourth block diagram, including an exploded schematic view of a fourth exemplary LiDAR device, showing an object of interest that has moved during several LiDAR illumination cycles to a new distance from the LiDAR device, in accordance with one embodiment.

FIGS. 6A-6F are further illustrations showing movement of an object and real-time computation of velocity and acceleration, including, in certain embodiments, generation of real-time velocity and acceleration maps. For example, FIG. 6A is a fourth block diagram, including an exploded schematic view of a fourth exemplary LiDAR device 6, showing an object of interest 13 that has moved during several LiDAR illumination cycles to a new distance from the LiDAR device 40, in accordance with one embodiment.

Figure 6B:
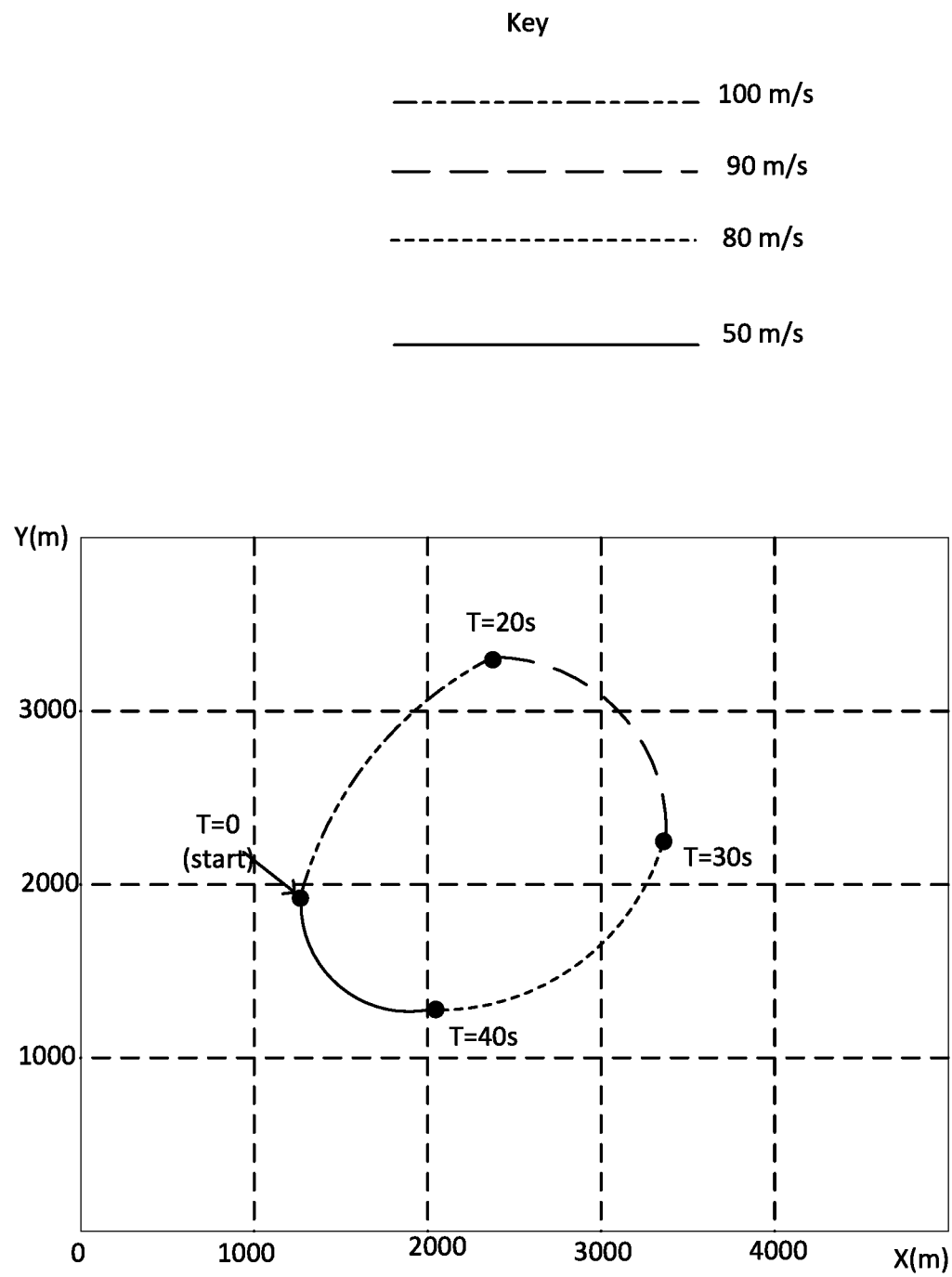
FIG. 6B is an exemplary graph showing a two-dimensional velocity map for the object movements tracked in FIG. 6A, in accordance with one embodiment.
Figure 6C:
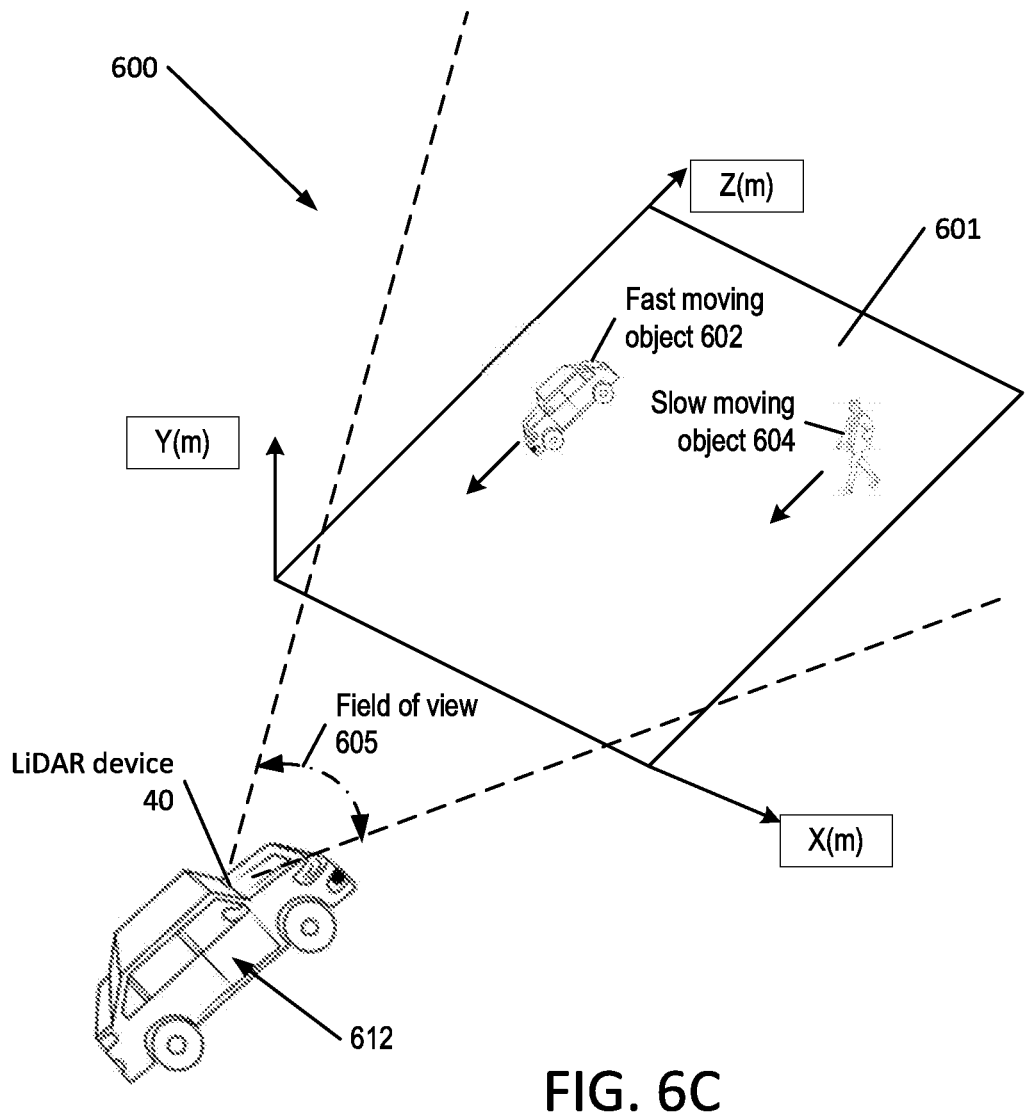
FIG. 6C is an exemplary view of objects in a velocity plane being that are to be scanned by the LiDAR device of FIGS. 1-6A, in accordance with one embodiment.
Figure 6D:
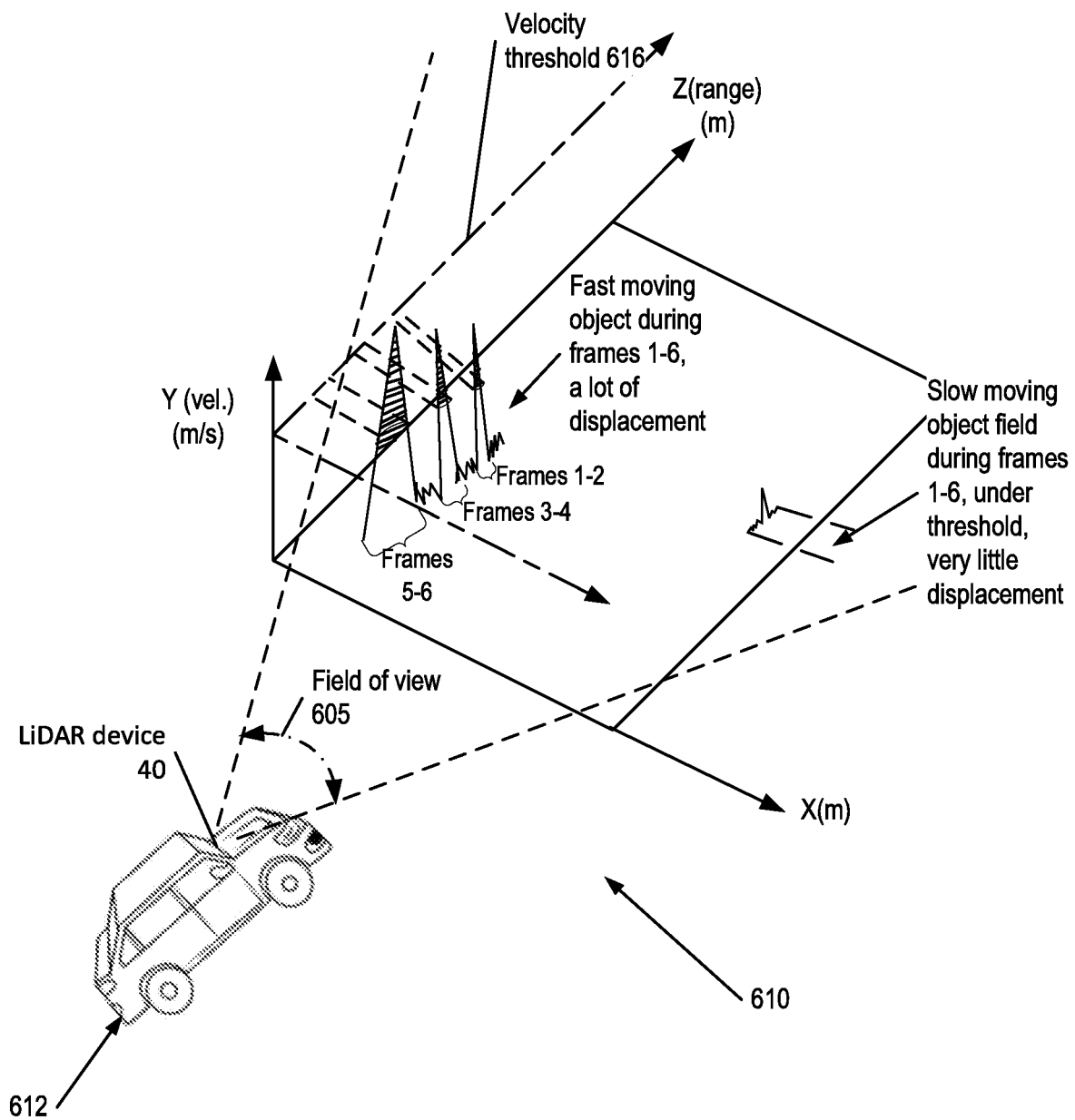
FIG. 6D is a first exemplary velocity map of six frames, in an amplitude threshold plane, for the objects of FIG. 6C, in accordance with one embodiment.
Figure 6E:
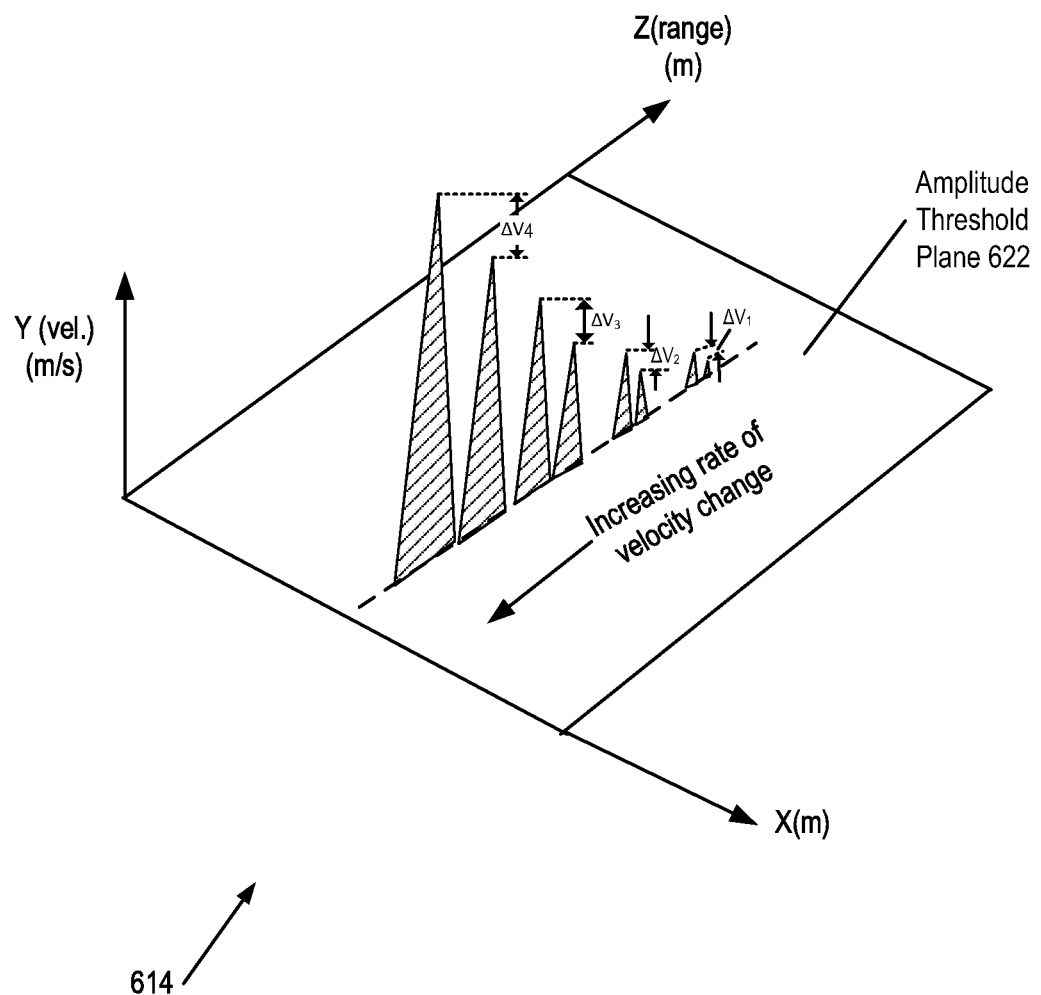
FIG. 6E is a second exemplary velocity map, showing 8 frames in an amplitude threshold plane, showing an increasing rate of velocity change for an object, in accordance with one embodiment.

For a given object 13 of interest, velocity is computed for each photodetector 20 within the digital focal plane array 25 so that a 2D array of photodetectors 18 produces a 2D velocity map (FIG. 6B) 46, or in certain embodiments, a 3D velocity map, as described below and as shown in FIGS. 6D and 6E.

FIG. 6B is an exemplary graph showing a two-dimensional (2D) velocity map 46 for the object movements tracked in FIG. 6A, in accordance with one embodiment. FIG. 6B depicts an exemplary resulting 2D real-time velocity map 46 for movement of an object 13 of interest, in an x-y space near a LiDAR 40. FIG. 6B shows instantaneous velocities, at three different points in time after a starting point (t=10s, 20s, 30s), for an object 13, where the instantaneous velocities were computed at given distances x, y relative to the LiDAR 40, using the apparatuses, methods, and systems described herein in connection with FIGS. 1-10. The 2D velocity map 46 at t=10s, for example shows that the object 13 had a velocity of 100 m/s. Although not depicted in the 2D velocity map, it will be appreciated that the entire stretch between 0s and 10s also had many instantaneous velocity measurements taken, such that a substantially continuous trace is shown in the 2D velocity map. For simplicity, the 2D velocity map 46 shows that the object 13 has the same velocity for all points 0s<t≤10s and same velocity for all points 10s<t≤20s, etc., but one of skill in the art will appreciate that actual velocity maps can have significantly more variation. Advantageously, the LiDAR device 40 also can be used to generate real-time three-dimensional (3D) velocity and acceleration maps, as described below.

As the timing diagram of FIG. 10 shows, the instantaneous velocity of the object 13 being tracked decreased over the integration frame. Similarly, the 2D velocity map 100 of FIG. 6B shows, for the object, a decreasing velocity over time. In one embodiment, a single velocity image is calculated in response to at least three detections of at least one object of interest.

FIG. 6C is an exemplary perspective view 600 of objects in a velocity plane 601 (including a fast moving object 602, such as a first vehicle and a slow moving object 604, such as a pedestrian) that are to be scanned by the LiDAR device 40 of FIGS. 1-6A, in accordance with one embodiment. An example possible location for placement of the liDAR device 40 is indicated as being on the front of a vehicle 612 (FIGS. 6C, 6D), but this is not limiting, and in FIG. 6D the actual liDAR device 40 is not illustrated and 6D, but the liDAR device 40 is not actually visible in the representation of the second vehicle 612. As one of skill in the art will appreciate, the liDAR device 40 could be mounted in other locations; for example, the liDAR device 40 could be mounted to or within a second vehicle 612 so that the liDAR device 40 is oriented to scan one or more fields of view 605 in a 360 degree view around the vehicle 612. It will be appreciated that the example location for a liDAR device 40, as depicted in FIGS. 6C and 6D for the second vehicle 603, is not limiting.

Figure 6F:
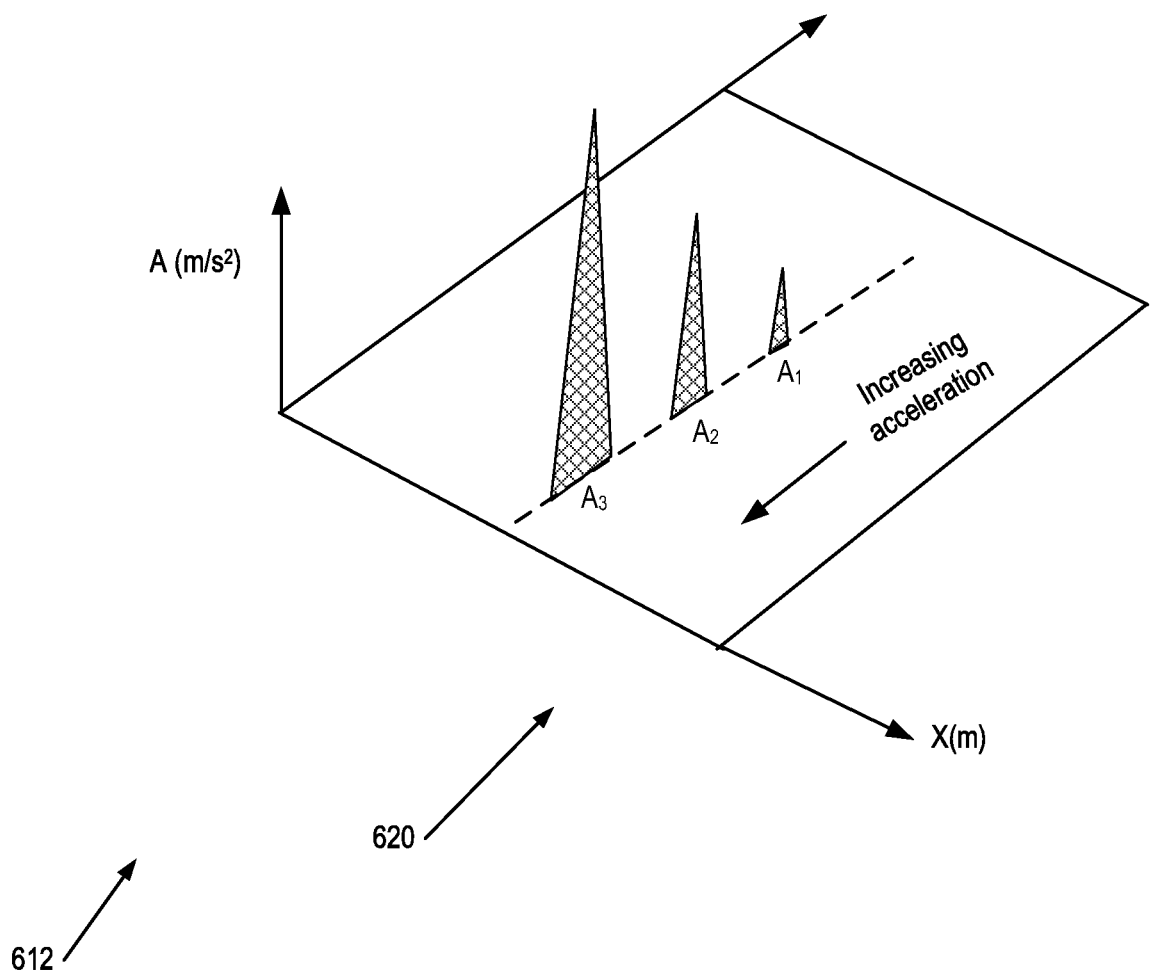
FIG. 6F is an exemplary acceleration map, showing increasing acceleration, based on the velocity map of FIG. 6E, in accordance with one embodiment.

Referring briefly to FIGS. 6D-6F, FIG. 6D shows 6 frames of a velocity map 610 for the situation of FIG. 6C. FIG. 6D includes dashed lines indicating a predetermined velocity threshold 616, wherein if the object velocity exceeds the threshold 616, in a given pair of frames (e.g., frames 1-2, 3-4, and/or 5-6) then, in certain embodiments, an alarm or other alert is generated. In FIG. 6D, the shading on the velocity "peaks" of the map indicate portions of the frames where the object in question (the fast-moving object 602 of FIG. 6C) had a velocity that exceed the predetermined threshold 616. In addition, as FIG. 6D, shows, the slow-moving object 604 of FIG. 6C has very little displacement, such that its velocity will be under the threshold 616.

FIG. 6D is a first exemplary velocity map 610 showing object movement, within field of view 605, during six frames (shown in the figure as frames 1-6), in an amplitude threshold plane 601, for the objects of FIG. 6C, in accordance with one embodiment. As FIG. 6D shows, the faster moving object 602 of FIG. 6C, has a lot of displacement during the 6 frames, including displacement above a threshold level 616 (the displacement above the threshold 616 is depicted as shaded in FIG. 6D). In contrast, as FIG. 6D the slower moving object 604 has very little displacement and that displacement is under the threshold level. As will be appreciated, FIG. 6D depicts just one small portion of what the liDAR device 40 is able to detect, showing just as few frames (out of many frames) within one field of view 605 (out of multiple fields of view).

FIG. 6E is a second exemplary velocity map 614, showing 8 frames of a velocity map and showing the portions of the frames that lie above an amplitude threshold plane 622. FIG. 6E depicts an increasing rate of velocity change for an object, in accordance with one embodiment. For each pair of velocity peaks, a respective rate of velocity change is computed ($\Delta V$). In this example, as shown in FIG. 6E, the four velocity changes computed are $\Delta V_1$, $\Delta V_1$, $\Delta V_3$, and $\Delta V_4$. As shown in FIG. 6E, the rate of velocity change is increasing, such that $\Delta V_1 < \Delta V_1, < \Delta V_3 < \Delta V_4$. This means that the fast-moving object 602 of FIGS. 6C-6D, is accelerating, and based on the computed changes in velocity, acceleration can be computed, and an acceleration map can be generated.

FIG. 6F is an exemplary acceleration map 620, showing increasing acceleration, based on the velocity map of FIG. 6E, in accordance with one embodiment. Each respective acceleration computation ($A_1$, $A_2$, $A_3$) is based on computing differences between the velocity differences of FIG. 6E, wherein:

$$A_1 = f(V_2 - V_1)$$

$$A_2 = f(V_3 - V_2)$$

$$A_3 = f(V_4 - V_3)$$

$$A_3 > A_2 > A_1$$

As FIG. 6F illustrates and based on the calculations above (which will be understood by those of skill in the art), the fast-moving object 602 of FIG. 6C has increasing acceleration. Thus, the LiDAR device 40 of FIGS. 1-7 actually is configured to operate not just in a real-time LiDAR mode, but also in a real-time Light Detection And Velocity and Acceleration (LiDAVA) mode, such that the LiDAR device 40 delivers velocity and acceleration maps (e.g., as shown in FIGS. 6B, 6D, 6E, and 6F), in real-time, for objects of interest within a region of interest (e.g., as shown in FIG. 6C). This can be faster and more efficient than performing such calculations by processing detected changes through three or more point clouds. In certain embodiments, the configuration of a plurality of LiDAR detectors 40 into a 2D array, as described herein, supports this computation of velocity and acceleration maps as described herein. For example, in certain embodiments, the 2D array has sufficient density, and a method of operation, as described herein, to support real-time computation of velocity and acceleration maps.

In this example structure of FIGS. 1-7, the ROIC 23 is a silicon based ROIC, although other materials known in the art may be utilized. The ROIC 23 is configured to generate a LiDAR velocity image based on signals received from the detector array 18. The ROIC 23 is configured to digitize the LiDAR 3D velocity-cloud image frame of the region of interest received from the detector array 18.

Figure 7:
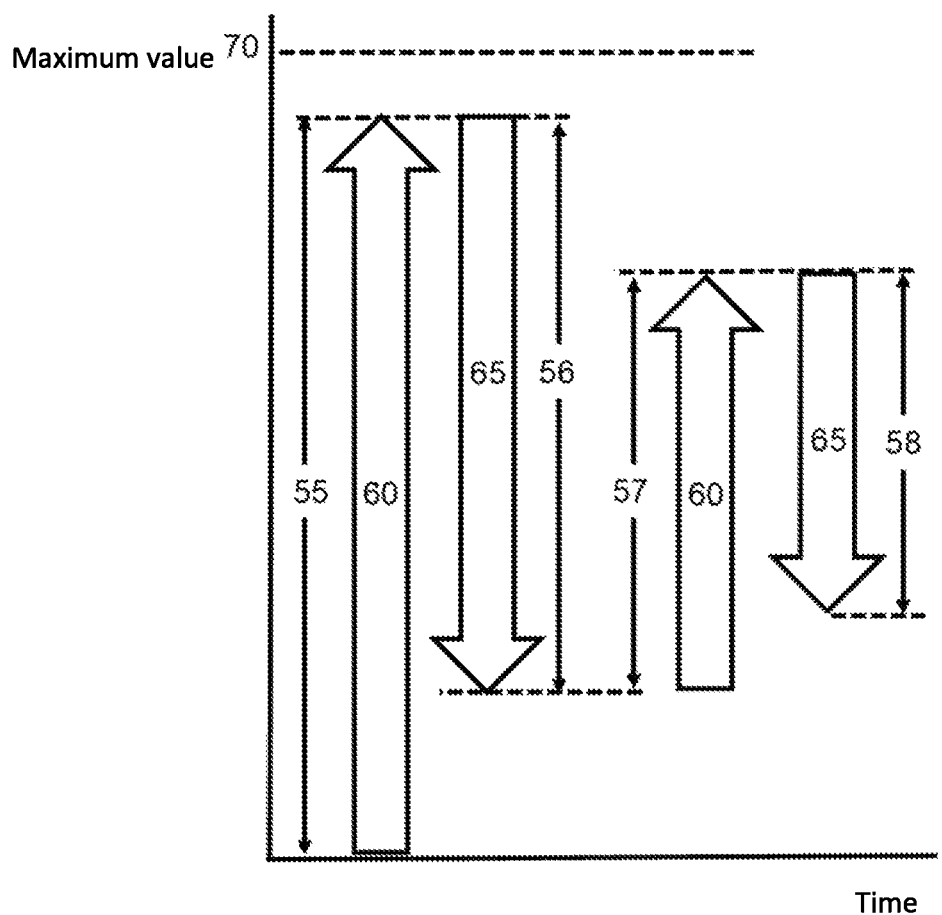
FIG. 7 is a third illustrative graph depicting a third digital timer status correlated to the new object distance of FIG. 6A, in accordance with one embodiment.

Recall that FIG. 6A illustrated a fourth exemplary LiDAR device 6, showing an object of interest 13 that moved during several LiDAR illumination cycles to a new distance from the LiDAR device 40, in accordance with one embodiment. FIG. 7 is a third illustrative graph 7 depicting a third digital timer status correlated to the new object distance of FIG. 6A, in accordance with one embodiment.

Referring to FIGS. 10, 6A and 7, one embodiment of an acceleration image or acceleration map, such as the acceleration map of FIG. 6F, may be created in real time from at least three illumination cycles (e.g., in FIG. 10, cycles A, B, and C, which go, respectively, with flashes 1004A, 1004B, and 1004C), resulting in reflected beams 14 from the at least one object 13. In this example, the object 13 moves within the region of interest 12 the distance 67, approaching the LiDAR 40 to a range of 62. Four illumination cycles (1004A, 1004B, 1004C, and 1004D) are completed, with the digital timer 26 alternating between incrementing and decrementing, as shown in FIGS. 7 and 10.

The first LiDAR 40 detection, associated with return 1008A, increments 60 the timer to a value 55 that is short of the timer maximum 70 (similar to what was discussed above in connection with FIGS. 3-5). The second detection cycle, associated with return 1008B, decrements 65 the timer by an amount 56 corresponding to the new position of object 13. And the process repeats for a total of four detection cycles, as shown in FIGS. 7 and 10. The object 13's range, velocity and acceleration can be calculated, e.g., as discussed above in connection with FIGS. 6B-6F above). For example, the object 13's instantaneous velocity between any two flashes is computed by the timer difference corresponding to the two flashes and the time between flashes. In another example, the average velocity of the total cycle can be calculated from the calculating the total distance displaced divided by total period from first flash to last detection.

Referring to the timing diagram 7 of FIG. 7 and 1000 of FIG. 10, the total distance 67 displaced by the object 13 is the timing difference between the first two flashes 1004A, 1004B (55-56) plus the timing difference between the third and fourth flashes 1004C, 1004D (57-58). The sum of these differences all divided by the time elapsed from the beginning of the first flash to the first detection of the fourth flash yields the average velocity. FIG. 10 shows, for example, an average velocity signal 1014.

Real-time acceleration of the object 13 may be calculated by examining the rate of change of velocity measurements, e.g., as discussed above in connection with FIGS. 6B-6F. For this example of FIG. 6A and FIG. 7, the illumination flashes 1004A, 1004B, 1004C, 1004D, as shown, for example in the timing diagram of FIG. 10, are periodic, and the time between all flashes is constant (e.g., in the example of FIG. 10, approximately 20 µs, but this is exemplary and not limiting). The instantaneous object velocity between the first two flashes 1004A, 1004B (related to 55-56) can be compared to the instantaneous velocity between the third and fourth flashes 1004C, 1004D (related to 57-58). If the first velocity measurement is smaller than the second, then the object is known to be accelerating towards the LiDAR device 40 and the rate of acceleration can be calculated by analyzing the rate of velocity change that occurred during the detection period. FIG. 10 includes an example illustration of acceleration 1018, The ROIC 23 outputs an acceleration image map 47.

It is understood that acceleration data can be calculated from any three flashes 1004 and returns 1008, resulting in detections of a like object 13. Furthermore, it is understood that within a dense 2D photodetector array 18, there may be many objects 13 moving in a disorganized manner and that instantaneous velocity and acceleration data, and average velocity and acceleration data, can be calculated for each object 13. For simplicity, certain of the figures herein depict just a single object 13 (FIGS. 1-6A) or a pair of objects, such as the slow-moving and fast-moving object, as shown in FIG. 6B. It is further understood that the repetition frequency of transmitter 10 flashes, the type of flashing pattern (e.g., fixed frequency, sawtooth, etc.) and the maximum digital timer value 70 (corresponding to maximum ToF detection range) may all be selected (e.g., initialized or dynamically in response to detections) to optimize calculations. In addition, thresholds to trigger alarms or other notifications, can be tailored based on the application. Furthermore, the characterization of an object as "slow-moving" or "fast-moving" can, of course, vary based on the environment and the relative speed (if any) of an apparatus onto which one or more liDAR devices 40 is attached. LiDAR devices 40 also could be attached to a fixed object, to an intermittently moving object, to an object in a stationary location but which has a predetermined fixed range of movement (e.g., rotating), and/or to an airborne movable vehicle. The examples described herein are illustrative and not limiting.

It will be noted that in the previous examples the LiDAR 40 can be configured to readout a single image that resulted from two or more LiDAR detection cycles. Returning to FIGS. 7 and 10, for example, the LiDAR output acceleration image 47 results from four flashes 1004A-1004D and four detected beams (returns) 1008A-1008D from an object 13. It is understood that this may be expanded to encompass many more detection cycles, for example dozens or hundreds, so that average velocity and acceleration images can be calculated based on time frames ranging from very brief to very long.

The nature of the DFPA 25, and specifically the digital timer 26, enables a means for simple corrections to be introduced to the readout image. Once the error source has been quantified it can be represented as a digital timer correction image comprising increments and decrements of an amplitude equal to and opposite to the error image. The digital timer 26 can be preset to the negative of the correction image. In this manner the timers 26 can be pre-loaded with correction data, and subsequent images will be readout already in a corrected form. Error sources include, by way of example and not limitation, pixel-to-pixel nonuniformity, low frequency (i.e. 1/f) noise, slowly varying electronic errors, optical distortion (e.g., pin cushion, barrel, mustache) and others. It is understood that more than one correction image may be used by simply adding correction images to achieve an aggregate correction image.

For example, referring once again to FIG. 1, the exit optics 30 distributed the illumination as beams of light 11 throughout the region of interest 12. Some regions of interest 12 instead may involve very wide fields of view (FoV) and introduce optical distortion of the reflected beams 14 as passed through the collecting optics 31. To the degree this distortion is fixed and time invariant, it can be quantified and eliminated from subsequent range, velocity and acceleration calculations. If the LiDAR 40 is positioned such that it images a flat perpendicular surface spanning at least the entire FoV, the resulting range map should ideally be a constant value (ignoring noise fluctuations). Any deviation from this ideal constant can be quantified and recorded in a correction/corrective map and for example implemented as a pre-increment or pre-decrement to the digital timers so that subsequent images will have the fixed distortion removed prior to image readout. For example, in one embodiment, a corrective map is preset within the digital timer array to introduce corrections for at least one of pixel nonuniformity, low frequency noise, electronic noise, and optical distortion.

For the 3D LiDAR "depth image," potential objects of interest may be manipulated, conditioned and classified using edge enhanced thresholding to outline the objects in the image frame, although other object detection methods can be utilized. The DFPA 25 lends itself very well to this type of simple image processing. For example, the DFPA 25 may create an image frame that exhibits low spatial frequency content which may be achieved by a binning process that combines data from at least two contiguous photodetectors. Combining additional contiguous (such as spatially adjacent) photodetectors 20 into one representative macro-photodetector will produce a lower frequency image. This "low pass" image may be subtracted from the next unconditioned image by pre-loading the digital timers 26 with increment and decrement values corresponding to the calculated low pass image. The result of subtracting the low pass image from a standard image is to highlight higher spatial frequency content thereby achieving a "high pass" image where edges will be more pronounced than the standard image.

Figure 8:
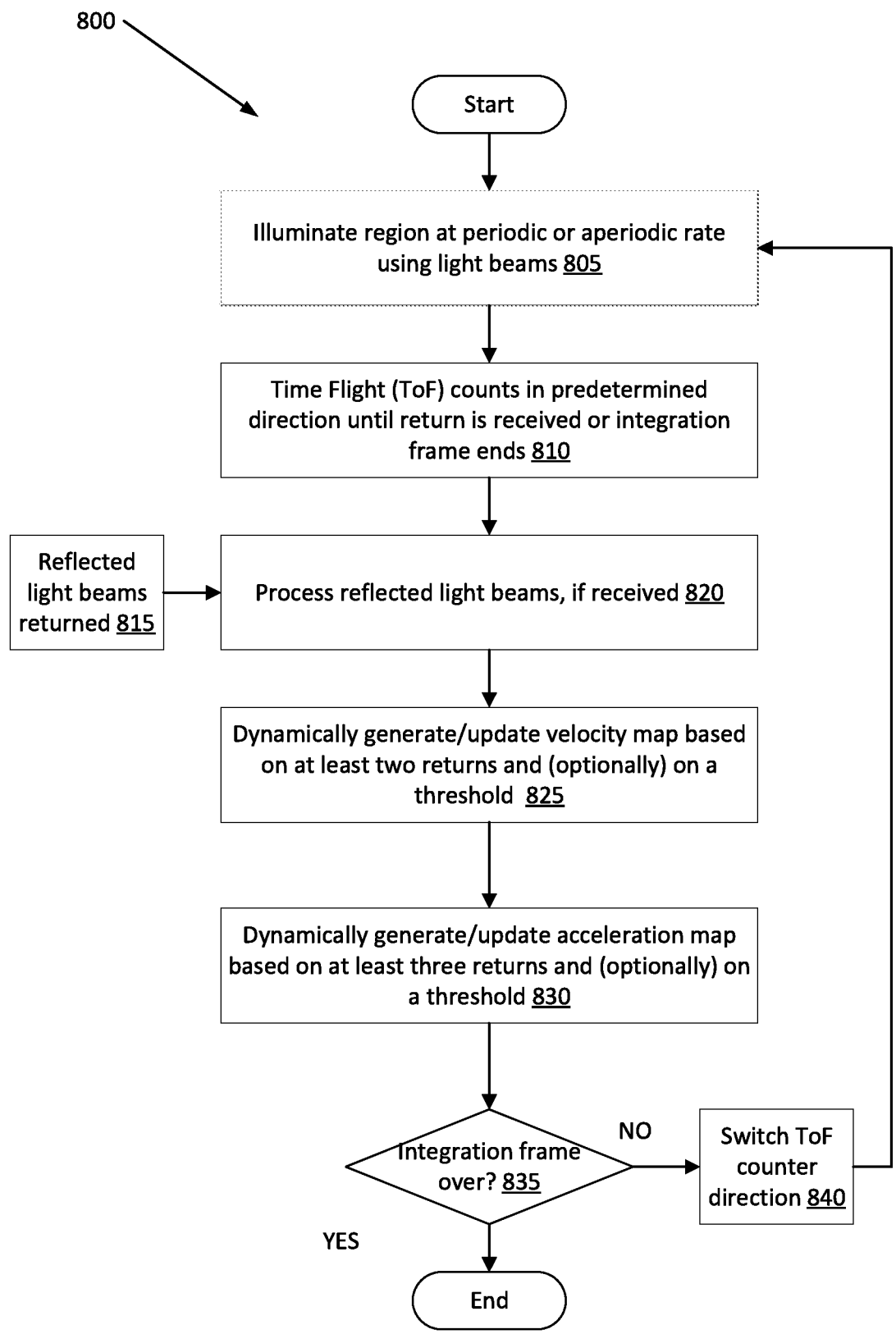
FIG. 8 is a first flowchart showing a first method for determining velocity and acceleration, in accordance with one embodiment.

FIG. 8 is a first flowchart 800 showing, at high level, a first method for determining velocity and acceleration, in accordance with one embodiment. The method of FIG. 8 is applicable at least to the exemplary embodiments of FIGS. 1-7. Referring to FIGS. 1-8, at block 805, the region of interest 12 is illuminated using light beams. The illumination can be at a periodic "flash" rate (e.g., as depicted in the timing diagram 1000 of FIG. 10. In some embodiments, the device (e.g., LiDAR device 40) periodically illuminates the region of interest 12, at a fixed pulse frequency, without regard to detected objects or velocities. In one embodiment, the laser transmitter emits in the Short Wave Infrared (SWIR) spectrum. In one embodiment, the transmitter device is comprised of at least two transmitters, where the at least two transmitters emit at least one of the same wavelength of light and a dissimilar wavelength of light.

In addition, as noted herein, in at least some embodiments, the illumination can be aperiodic. For example, in some embodiments, the device aperiodically illuminates the region of interest to improve the detection and velocity measurement of some objects of interest. The aperiodic illumination may follow a pattern such as one of increasing pulse frequency for example a "sawtooth" pattern of increasing frequency to a maximum and then resetting to the original frequency to repeat the cycle.

In some embodiments, in block 805, the device illuminates the region of interest with more than one temporal pattern of illumination, for example at a slow repetition rate followed by a high repetition rate, or by a sawtooth pattern followed by a fixed repetition frequency. In yet other embodiments, the device illuminates the region of interest, in block 805, at a rate selected in response to a detected object's size, location, velocity or acceleration.

In block 810, the Time of Flight counter counts, in a predetermined direction, until a return is received or until the integration frame/range gate ends (e.g., digital timer max value). In one embodiment the digital timers are incremented and decremented in the same inconstant manner, such as a linear rate of change or a curvilinear rate of change. This produces a velocity resolution as a function of range. For example, the timer may begin incrementing in a linear fashion and then at one third of the maximum timer value progressively accelerate the rate of incrementing until the maximum timer value is reached or a reflected beam stops the digital counting. In this manner a larger digital timer step size is realized in the first third of the LiDAR's range measurement equating to a diminished capacity to resolve small position and velocity changes, while enjoying an enhanced ability to resolve range and velocity at ranges equating to the more distant two thirds of the region of interest.

In one embodiment, in block 810, the digital timers may be incremented and decremented more than the minimum two cycles required for velocity calculations and more than the minimum three cycles required for acceleration calculations, prior to reading out the digital timer status. For example, 50 illumination cycles or "flash pings" may produce 25 pairs of timer increments and decrements resulting in a single velocity image readout. This technique can be used to calculate the average velocity or average acceleration during the time elapsed. between the 50 flashes and is very effective at capturing high speed events without taxing the ROIC and without producing excessive data.

In one embodiment, the region of interest is portioned into at least two regions, one being nearer than the other. In this embodiment the maximum value of the timer for the closer region will be less than the maximum value of the timer for the far region. Since the resolution of ADC digitization of the timer signal remains the same for both near field and far field, the near field position and velocity calculation will enjoy a higher accuracy and resolution. This approach enables the region of interest to be segregated into two or more regions of differing range, with the closest subregion enjoying the highest measurement resolution and the farthest subregion enduring a lower resolution when a fixed timer increment is used.

In one embodiment, the digital timer maximum value (block 810) and the illumination pulse frequency (block 805) may be chosen together to optimize the accuracy and resolution of an object's velocity at a particular range. For example, in one embodiment, for optimal calculated velocity accuracy the LiDAR system may be configured to have a small maximum timer value that limits the LiDAR to near field operation, and concurrently increase the illumination repetition rate so that very small position and velocity changes are detected quickly and accurately. In at least some embodiments, this technique of adjusting the velocity measurement accuracy may be adopted and tuned dynamically by the LiDAR, for example in response to detecting an object with a behavior that warrants specialized scrutinization. Furthermore, objects may be tracked throughout the region of interest where tracked objects may require differing and time variant velocity and acceleration measurement accuracy.

In one embodiment, in block 805 and 810, the timer of block 810 is started at a point after the laser projects illumination in block 805, and not concurrent with the illumination (although in some embodiments it is concurrent with the illumination). In one embodiment, the timer's maximum value can be chosen to define a maximum LiDAR range, and the minimum timer value can be chosen to define a minimum LiDAR range. Introducing a delay between when the laser illuminates (block 805) and when the timer starts (block 810) enables an area in the foreground to be ignored in the LiDAR range, velocity and acceleration calculations. This is advantageous when there is a known obscurant in the foreground. Another benefit is that the full digital resolution of the ADC acting upon the timer will yield a higher range resolution in the reduced region of interest.

Referring again to FIG. 8, when reflected light beams (e.g., returns 1008) are received (block 815, 820) they are processed, as described above in connection with FIGS. 1-7, to determine velocity and acceleration, including, if applicable, a velocity map (block 725) and an acceleration map (block 730). This process repeats, e.g., for every periodic or aperiodic illumination, until the integration frame is over (block 735), wherein in between the flashes, the ToF counter direction is changed from increment to decrement and vice versa (block 740).

In one embodiment the device acts in velocity mode and reports only the velocity calculated for each pixel, so that a stationary LiDAR device viewing a static scene will render as a null (or noise limited) image. In this embodiment and mode of operation, only objects in motion relative to the LiDAR will appear on the calculated velocity map in block 725, where the amplitude of the object velocity will manifest as intensity on the velocity map (e.g., a velocity map 46 such as shown in FIG. 6B). For example, several objects in motion may be detected concurrently, each with a unique intensity corresponding to the objects' speed.

Furthermore, for an object that subtends a plurality of photodetectors, or pixels, the change in velocity across the object's shape may be used to calculate the object angular velocity and angular acceleration, for example in autonomous vehicle applications this may indicate a car turning within the region of interest.

In another embodiment, in blocks 820 and 825, a velocity threshold may be applied to the measured velocity, so that only objects above or below the threshold are reported. This technique may also be applied to calculated acceleration data.

In yet another embodiment, the device is mounted on a moving platform so that the perceived scene ahead of the LiDAR comprising the background and static objects within the region of interest are reported as having a velocity, and where the velocity threshold is chosen to detect and report objects moving faster or slower than the device, and towards or away from the device. For example, the velocity of the moving LiDAR platform may be calculated from a portion of the region of interest. In the autonomous vehicle application, the LiDAR may image the road directly ahead of the vehicle mounting the LiDAR to derive the LiDAR's own velocity. This LiDAR velocity measurement may be subtracted or pre-decremented from the digital timer so that subsequent velocity measurements of the entire region of interest indicate only velocities relative to the LiDAR. For example, returning to the autonomous vehicle example, the moving background perceived by the LiDAR in motion would be subtracted from the calculated velocity image. The same technique applies equally to acceleration data.

Figure 9:
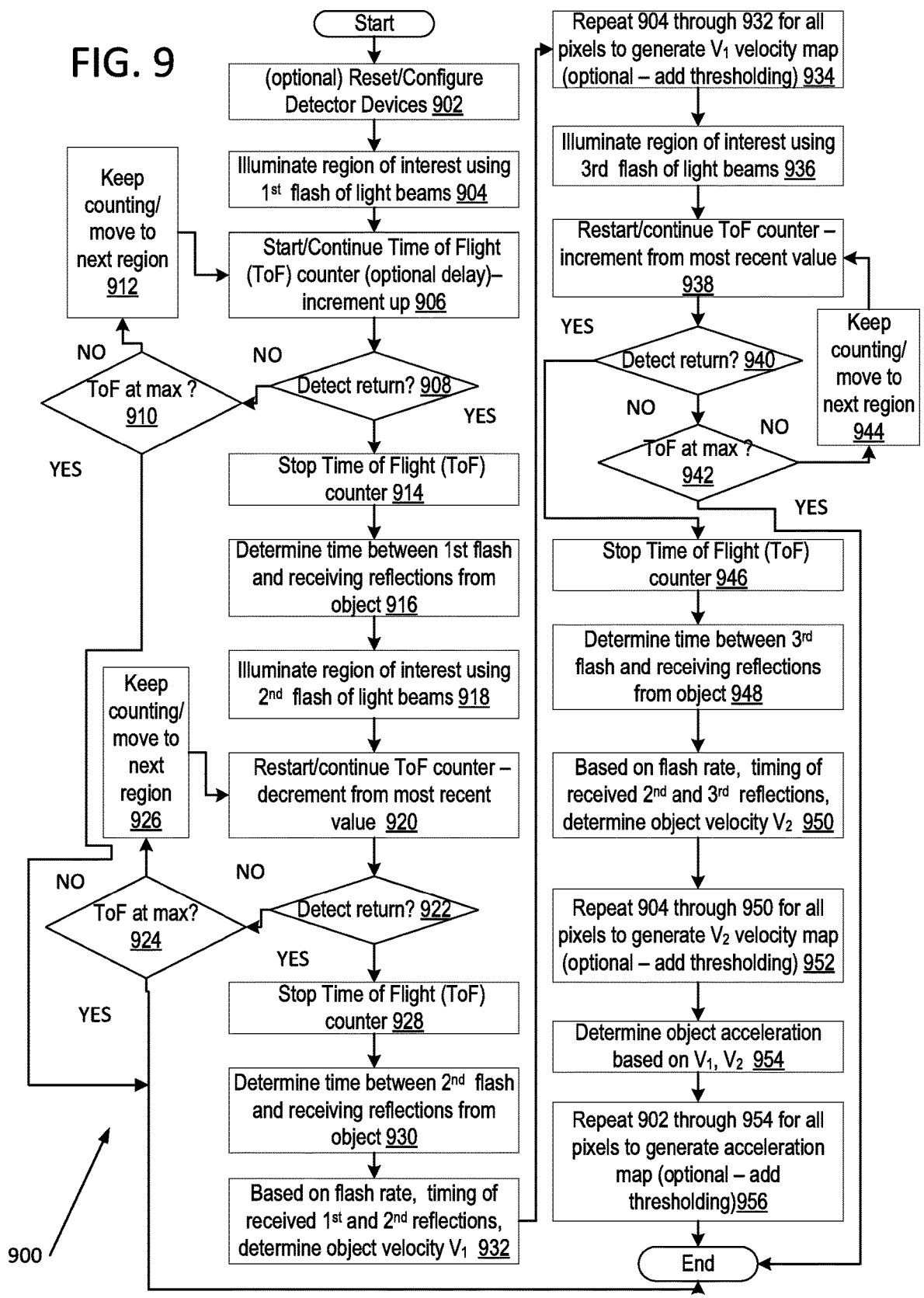
FIG. 9 is a second flowchart showing a second method for determining velocity and acceleration, in accordance with one embodiment.

FIG. 9 is a second flowchart 900 showing a second method for determining velocity and acceleration, and velocity and acceleration maps, in accordance with one embodiment. The method of FIG. 9 summarizes, in a specific series of steps, the processes discussed above in FIGS. 1-8. FIG. 9 can be read in connection with FIGS. 1 and 6A-8, to follow a full set of process steps, including computation of velocity and acceleration, for a given pixel. In certain embodiments, the method of FIG. 9 also could be done for a block of contiguous pixels, as well.

Referring to FIGS. 1, 9, and 10, if necessary, the detector devices are reset and/or configured (block 902), for each detector array 18, to be configured for a ToF LIDAR measurement. The region of interest is illuminated with a first flash of light beams 1004A (block 905), and the ToF counter 1006A starts (block 806), optionally after a delay. If a return 1008A is not detected (answer at block 908 is NO) and the digital counter (ToF counter) 1006A is not at its maximum value (answer at block 910 is NO), then the ToF counter 1006A continues counting in the same direction (block 912), which in this case is incrementing. In the timing diagram 1000 of FIG. 10, the ToF count signal 1010 linearly tracks the upward counting of the ToF counter, during the duration of the first ToF signal 1006A.

If the answer at block 910 is YES (i.e., the ToF is at its max), then integration and processing stops. This also is true for if the answer is NO at either of blocks 924 or 942 of FIG. 9.

If the answer at block 908 was YES, a return 1008a was detected, and the ToF counter 1006A is stopped (block 814). An initial computation is made, such as a determination of the time between the start of the first flash and the return 1008A. Then the region of interest is illuminated with the $2^{nd}$ flash 1004b of light beams (block 918) As shown in timing diagram 1000, the ToF counter 1006B restarts its counting, but it decrements from the most recent count value (block 810). As shown in the timing diagram of FIG. 10, with the second flash 1004B, the slope of the ToF count signal 1010 is negative, indicating the ToF counter is decrementing; but, note that the ToF count 1010 is counted down from the level at which it had counted up following the first laser pulse. The ToF counter continues to count downward (block 926) until either a second return is detected (block 22) or the ToF reaches its maximum value (block 924). When the second return 1008B is detected (block 922), the ToF counter 1006B and ToF Count 1010 are both stopped (block 928). The time between the second flash 1004B and receiving the return (1008B) is determined (block 920), and, based on the flash rate, the timing of the received first and second returns 1008A, 1008B, a first velocity $V_1$ can be determined (block 832), as previously discussed.

Blocks 904 through 932 are repeated for all pixels to generate a $V_1$ velocity map (block 934). For example, in certain embodiment, blocks 904 through 932 are repeated for each pixel to create a range map. Optionally thresholding can be used to selectively determine information that is part of this velocity map, as discussed previously. In a similar manner, the region of interest can be illuminated using a third flash of light 1004C (block 936), with the ToF counter 1006C and ToF count 1010 restarted from the most recent ToF count value 1010, but this time back in an incrementing direction. This is shown in the timing diagram 1000 with the positive slope of the ToF count 1010, beginning in portion C of the integration frame 1002. Blocks 840-852, respectively are substantially the same as blocks 822-834, respectively, as will be appreciated by one of skill in the art, and the detailed discussion of these is not repeated here. It also will be appreciated that the alternating incrementing and decrementing counts, as the object of interest is flashed, can be continued for many more cycles, as discussed elsewhere herein. The limited number of cycles shown for the timing diagram of FIG. 10 and the method of FIG. 9, is provided to illustrate an exemplary set of operations applicable to many different configurations, including those with many more cycles and cycles that vary aperiodically, etc. as discussed above. Once the three cycles of velocity have been calculated, object acceleration can be computed (block 954), via computations well understood in the art. By repeating blocks 902-954 for all pixels, for multiple pairs of velocity measurements, an acceleration map also can be dynamically generated. As will be appreciated, the velocity and acceleration maps need not be totally populated with every pixel, and, in certain embodiments, such maps can be as simple as a single acceleration computation based on two velocity measurements.

Additional embodiments and variations are possible. In one embodiment, the LiDAR comprises a DFPA comprising a non-silicon photodetector array for SWIR detection and a silicon architecture for collecting, digitizing and analyzing the received photodetector signals. Many novel LiDAR features are thus possible, for example pre-loading the digital timers is a potent technique that can be used to proactively remove non-time-variant artifacts such as pixel to pixel nonuniformity and optical distortion induced by the collecting optics.

In one embodiment the DFPA may combine a plurality of contiguous (or spatially adjacent) photodetectors to form a virtual macro-pixel, for example a block of 2 by 2 or 10 by 10 photodetectors. This technique serves to lower the effective spatial resolution of the photodetector array, which may be desirable at times to aid in image processing or to improve aggregate photosensitivity.

In one aspect a method for implementing a Time of Flight (ToF) device for detecting the velocity of an object of interest within a region of interest, is provided. The method includes transmitting, e.g., by a transmitting device, at least two light beams, the second subsequent to the first, to the region of interest, so that the at least two light beams can be reflected from an object of interest. The at least two light beams, reflected from the object of interest, are received by a by a digital focal plane array (DFPA) device comprising at least one photodetector. A digital focal plane array (DFPA) device is operably coupled to the transmitting device and is configured for controlling the commencement timing of the at least two sequential transmit beams emanating from the transmitting device, and the cessation timing of a Time of Flight (ToF) measurement that is derived from the detection of the at least two received light beams of the receiving device. The timing of the received light beams is digitized by a digital focal plane array (DFPA) device, where the DFPA device comprises a digital timer that marks ToF in an ascending manner for a first ToF measurement and in a descending manner for a subsequent ToF measurement. A velocity corresponding to at least one object of interest is calculated, e.g., by the DFPA device, by comparing an ascended ToF measurement of the first received light beam, a descended ToF measurement of the subsequent received light beam, and the time between the transmitted first and received subsequent light beams.

In some embodiments, the transmitter device emits in the Short-Wave Infrared (SWIR) spectrum. In some embodiments, the transmitter device is comprised of at least two transmitters where the at least two transmitters emit at least one of the same wavelength of light and a dissimilar wavelength of light. In some embodiments, the transmitter emits light in at least one of a periodic frequency and an aperiodic frequency. In some embodiments, in response to a detected object range the transmitter repetition frequency is at least one of increased and decreased. In some embodiments, in response to a detected object velocity the transmitter repetition frequency is at least one of increased and decreased.

In certain embodiment, the velocity image is calculated from a plurality of photodetectors in response to at least two detections of the at least one object of interest. In some embodiments, the timer increments and decrements in discrete steps that are at least one of constant in step size and constant rate of change in step size and comply with a curvilinear rate of change in step size. In some embodiments, in response to a laser pulse, the timer begins marking time at least one of after a delay and concurrently. In some embodiments, the timer has at least two dissimilar maximum values each corresponding to a dissimilar maximum range corresponding to the farthest border of the at least two regions of interest. In some embodiments, in response to a detected object the maximum value of the timer prior to digitization is at least one of increased and decreased.

In further embodiments, the calculated average velocity is calculated from at least one of sequential light beams and non-sequential light beams. In further embodiments, a single velocity or average velocity image is calculated in response to at least three detections of at least one object of interest. In some embodiments, spatially adjacent photodetectors may be aggregated into macro pixels. In some embodiments, a velocity threshold is applied to at least one of a velocity map of the region of interest and a velocity measurement of an object. In some embodiments, the velocity of the device is calculated and subtracted from subsequent velocity measurements. In some embodiments, a corrective map is preset within the digital timer array to introduce corrections for at least one of pixel nonuniformity and low frequency noise and electronic noise and optical distortion.

In a further aspect, a method for providing a Time of Flight (ToF) device for detecting the acceleration of an object of interest within a region of interest, is provided. The method comprises:
  transmitting, by a transmitting device, at least three sequential light beams to the region of interest and reflecting from at an object of interest:
  receiving, by a by a digital focal plane array (DFPA) device comprising at least one photodetector, the at least three light beams reflected from the object of interest;
  controlling, by a digital focal plane array (DFPA) device coupled to the transmitting device, controlling the commencement timing of the at least three sequential transmit beams emanating from the transmitting device, and the cessation timing derived from the detection of the at least three received light beams of the receiving device;
  digitizing by a digital focal plane array (DFPA) device, digitizing the timing of the received light beams, where the DFPA device comprises a digital timer that marks time of flight in an ascending manner for one ToF measurement and in a descending manner for the subsequent ToF measurement, and
  calculating by a digital focal plane array (DFPA) device, calculating the acceleration corresponding to at least one object of interest by comparing the ascended ToF measurement of the first received light beam, the descended ToF measurement of the subsequent received light beam, and the ToF at least one other beam and the time between the transmitted first beam and detected last beams.

In further embodiments of this method, the transmitter device emits in the Short-Wave Infrared (SWIR) spectrum. In some embodiments, the transmitter device is comprised of at least two transmitters where the at least two transmitters emit at least one of the same wavelength of light and a dissimilar wavelength of light. In some embodiments, the transmitter emits light in at least one of a periodic frequency and an aperiodic frequency. In some embodiments, in response to a detected object range the transmitter repetition frequency is at least one of increased and decreased. In certain embodiments, in response to at least one of the detected object velocity and object acceleration the transmitter repetition frequency is at least one of increased and decreased. In some embodiments, the acceleration image is calculated from a plurality of photodetectors in response to at least three detections of the at least one object of interest.

In further embodiments, the digital timer increments and decrements in digital steps that are at least one of constant in step size and constant rate of change in step size and comply with a curvilinear rate of change in step size. In some embodiments, in response to a laser pulse the timer begins marking time that commences at least one of after a delay and concurrently. In some embodiments, the digital timer has at least two dissimilar maximum values each corresponding to a dissimilar maximum range corresponding to the farthest border of the at least two regions of interest. In some embodiments, in response to a detected object the maximum value of the timer prior to digitization is at least one of increased and decreased. In some embodiments, contiguous photodetectors may be aggregated into macro pixels.

In some embodiments, the calculated average acceleration is calculated from at least one of sequential light beams and non-sequential light beams. In some embodiments, a single acceleration image is calculated in response to at least three detections of at least one object of interest. In some embodiments, an acceleration threshold is applied to at least one of an acceleration map of the region of interest and an acceleration measurement of an object. In further embodiments, the acceleration of the device is calculated and subtracted from subsequent acceleration measurements. In further embodiments, a corrective map is preset within the digital timer array to introduce corrections for at least one of pixel nonuniformity and low frequency noise and electronic noise and optical distortion.

In a still further aspect, a method is provided for implementing a Time of Flight (ToF) device for detecting the range of an object of interest within a region of interest, the method comprising:
  transmitting, by a transmitting device, at least one light beam to the region of interest and reflecting from at least one object of interest;
  receiving, by a digital focal plane array (DFPA) device comprising a plurality of photodetectors, the at least one light beam reflected from an object of interest;
  controlling, by a digital focal plane array (DFPA) device coupled to the transmitting device, controlling the commencement timing of a transmit beam emanating from the transmitting device, and the cessation timing derived from the detection of the at least one received light beam of the receiving device;
  digitizing, by a digital focal plane array (DFPA) device, digitizing the timing of the received light beams, where the DFPA device comprises a digital timer; and
  calculating, by a digital focal plane array (DFPA) device, calculating the range corresponding to at least one object of interest by comparing the timing measurement commencing a transmitted beam and ceasing with a subsequent received light beam.

In some embodiments, transmitter device emits in the Short-Wave Infrared (SWIR) spectrum. In further embodiments, the transmitter device is comprised of at least two transmitters where the at least two transmitters emit at least one of the same wavelength of light and a dissimilar wavelength of light. In some embodiments, the transmitter emits light in at least one of a periodic frequency and an aperiodic frequency. In some embodiments, in response to a detected object range the transmitter repetition frequency is at least one of increased and decreased. In further embodiments, in response to a detected object velocity the transmitter repetition frequency is at least one of increased and decreased. In some embodiments, contiguous photodetectors may be aggregated into macro pixels.

In some embodiments, the digital timer increments in digital steps that are at least one of constant in step size and constant rate of change in step size and comply with a curvilinear rate of change in step size. In some embodiments, in response to a laser pulse the timer begins marking time at least one of after a delay and concurrently. In some embodiments, the digital timer has at least two dissimilar maximum values each corresponding to a dissimilar maximum range corresponding to the farthest border of the at least two regions of interest. In some embodiments, in response to a detected object the maximum value of the timer prior to digitization is at least one of increased and decreased.

In certain embodiments, a range threshold is applied to a calculated range map of the region of interest. In some embodiments, a corrective map is preset within the digital timer array to introduce corrections for at least one of pixel nonuniformity and low frequency noise and electronic noise and optical distortion.

In the above-described flow charts and timing/sequence diagrams, certain elements (e.g., rectangular elements, diamond shaped elements), herein denoted "processing blocks," can, in at least some embodiments, represent computer software instructions or groups of instructions. Alternatively, the processing blocks may represent steps performed by functionally equivalent circuits such as a digital signal processor (DSP) circuit, graphical processor unit (GPU) or an application specific integrated circuit (ASIC). The flow charts and timing/sequence diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Further, the processes and operations described herein can be performed by a computer especially configured for the desired purpose or by a general-purpose computer especially configured for the desired purpose by another computer program stored in a computer readable storage medium or in memory.

Figure 11:
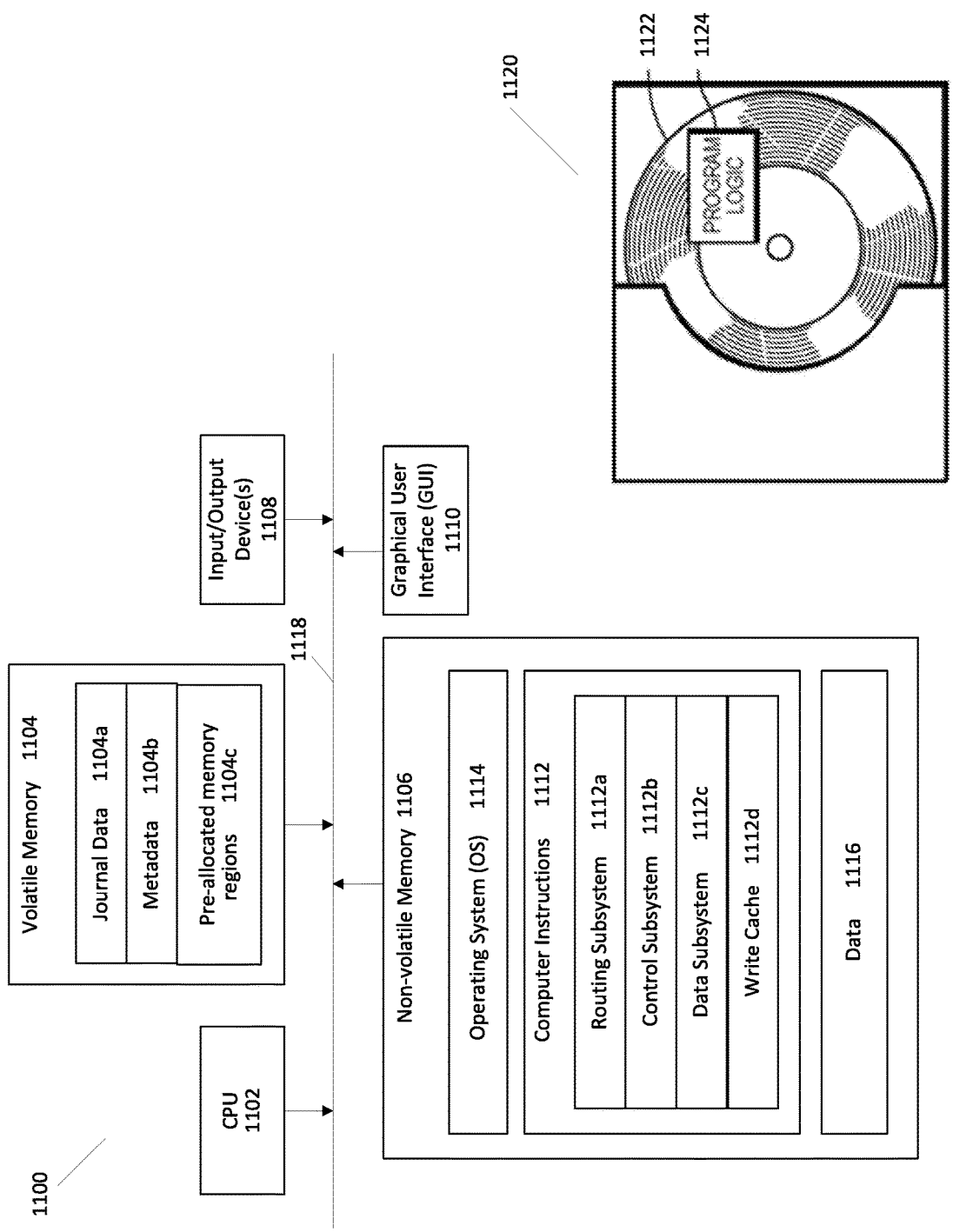
FIG. 11 is a simplified block diagram of an apparatus that may be used to implement at least a portion of the systems, apparatuses, and methods of FIGS. 1-10, in accordance with at least one embodiment.

FIG. 11 is a simplified block diagram of an apparatus that may be used to implement at least a portion of the systems, architectures, timing/sequence diagrams, and methods of FIGS. 1-10, in accordance with at least some embodiments.

As shown in FIG. 11, computer 1100 may include processor 1102, volatile memory 1104 (e.g., RAM), non-volatile memory 1106 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1110 (e.g., a touchscreen, a display, and so forth) and input and/or output (I/O) device 1108 (e.g., a mouse, a keyboard, etc.). Non-volatile memory 1104 stores, e.g., journal data 1104a, metadata 1104b, and pre-allocated memory regions 1104c. The non-volatile memory, 1106 can include, in some embodiments, an operating system 1114, and computer instructions 1112, and data 1116. In certain embodiments, the computer instructions 1112 are configured to provide several subsystems, including a routing subsystem 1112A, a control subsystem 1112b, a data subsystem 1112c, and a write cache 1112d. In certain embodiments, the computer instructions 1112 are executed by the processor/CPU 1102 out of volatile memory 1104 to perform at least a portion of the processes discussed and/or shown in connection with FIGS. 1-10. Program code also may be applied to data entered using an input device or GUI 1110 or received from I/O device 1108.

The systems, architectures, sequences, flowcharts, and processes of FIGS. 1-10 are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 11, which is useful for carrying out a method described with reference to embodiments shown in, for example, FIGS. 1-10. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor 1102 may be implemented by one or more programmable processors or controllers executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs) and/or controllers. In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 11, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 11 shows Program Logic 1124 embodied on a computer-readable medium 1120 as shown, and wherein the Logic is encoded in computer-executable code configured for carrying out the reservation service process of this invention and thereby forming a Computer Program Product 1122. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Having thus described the basic concepts of at least some embodiments, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the embodiments described herein are limited only by the following claims and equivalents thereto.

What is claimed is:

1. A method, comprising:
   transmitting a first light beam from a first location to a region of interest at a time $t_{1a}$, wherein the first light beam is configured to reflect off at least one object disposed in the region of interest to produce a first reflected light beam;
   incrementing a time of flight (ToF) counter until the reflected first light beam is received back at the first location;
   stopping the ToF counter at a first count value when the reflected first light beam is received at the first location at a time $t_{1b}$;
   transmitting a second light beam from the first location to the region of interest at a time $t_{2a}$, the time $t_{2a}$ being subsequent to the time $t_{1b}$, the second light beam configured to reflect off the least one object to produce a second reflected light beam;
   decrementing the ToF counter, starting from the first count value, until the reflected second light beam is received back at the first location;
   stopping the ToF counter at a second count value when the reflected second light beam is received back at the first location at time $t_{2b}$; and
   computing a real-time velocity of the object based at least in part on the first count value, which is a function of $t_{1a}$ and $t_{1b}$, and the second count value, which is a function of $t_{2a}$ and $t_{2b}$.

2. The method of claim 1, wherein the velocity of the object is computed solely based on the first count value, which is a function of $t_{1a}$ and $t_{1b}$, and the second count value, which is a function of $t_{2a}$ and $t_{2b}$.

3. The method of claim 1, further comprising:
transmitting a third light beam to the region of interest at a time $t_{3a}$, the time $t_{3a}$ being subsequent to the times $t_{1b}$ and $t_{2b}$, the third light beam configured to reflect off the least one object to produce a third reflected light beam;
incrementing the ToF counter, starting from the second count value, until the reflected third light beam is received;
stopping the ToF counter at a third count value when the reflected third light beam is received; and
computing a real time acceleration of the object based at least in part on the first count value, which is a function of $t_{1a} t_{1b}$, the second count value, which is a function of $t_{2a}$ and $t_{2b}$, and the third count value, which is a function of $t_{3a}$ and $t_{3b}$.

4. The method of claim 3, wherein the real-time acceleration of the object is computed solely based on the first count value, which is a function of $t_{1a}$ and $t_{1b}$, the second count value, which is a function of $t_{2a}$ and $t_{2b}$, and the third count value, which is a function of $t_{3a}$ and $t_{3b}$.

5. The method of claim 1, wherein the light beams are in the short-wave infrared (SWIR) spectrum.

6. The method of claim 1, wherein, in response to transmitting at least one of the first and second light beams, the ToF counter begins incrementing or decrementing, respectively, at least one of concurrently and after a delay.

7. The method of claim 1, wherein the first light beam and second light beam have different wavelengths.

8. The method of claim 1, further comprising:
transmitting a plurality of pairs of first and second light beams at the object, wherein a frequency of transmitting the plurality of pairs of first and second light beams, is dynamically adjusted based at least in part on a detected range to the at least one object.

9. The method of claim 1, further comprising transmitting a plurality of pairs of first and second light beams at the object, wherein a frequency of transmitting the plurality of pairs of first and second light beams, is dynamically adjusted based at least in part on the velocity of the object.

10. The method of claim 1, wherein the object has a size and wherein the ToF counter has a maximum value for at least one of incrementing and decrementing, wherein the maximum value is dynamically determined based at least in part on at least one of the size, range, velocity, and acceleration of the object.

11. The method of claim 1, wherein the method is configured to operate a light detection and ranging (LiDAR) device comprising a transmitter for transmitting the first and second light beams, a digital counter configured as the ToF counter, a photodetector array for receiving the reflected first and second light beams, and a controller for determining the object velocity, the controller in operable communication with the transmitter, digital counter, and photodetector array.

12. A device, comprising:
a transmitter configured to transmit one or more sequential beams of light to a region of interest, the one or more sequential beams of light configured for reflecting off at least one object disposed in the region of interest;
at least one photodetector configured for receiving one or more reflected beams of light, the one or more reflected beams of light corresponding to the one or more sequential beams of light after reflecting of the at least one object;
a counter configured to track a time of flight (ToF) interval corresponding to the time between when a given light beam is transmitted by the transmitter, reflected off the object, and then received back at the photodetector;
a controller in operable communication with the transmitter, photodetector, and ToF counter, the controller configured to:
cause the transmitter to transmit a first light beam from a first location to the region of interest at a time $t_{1a}$, wherein the first light beam is configured to reflect off a first object disposed in the region of interest to produce a first reflected light beam;
increment the ToF counter until the reflected first light beam is received back at the first location;
stop the ToF counter at a first count value when the reflected first light beam is received at the first location at time $t_{1b}$;
cause the transmitter to transmit a second light beam from the first location to the region of interest at a time $t_{2a}$, the time $t_{2a}$ being subsequent to the time $t_{1b}$, the second light beam configured to reflect off the first object to produce a second reflected light beam;
decrement the ToF counter, starting from the first count value, until the reflected second light beam is received back at the first location;
stop the ToF counter at a second count value when the reflected second light beam is received back at the first location at time $t_{2b}$; and
compute a real-time velocity of the first object based at least in part on the first count value, which is a function of $t_{1a}$ and $t_{1b}$, and the second count value, which is a function of $t_{2a}$ and $t_{2b}$.

13. The device of claim 12, wherein the controller is configured to compute the velocity of the first solely based on the first count value, which is a function of $t_{1a}$ and $t_{1b}$, and the second count value, which is a function of $t_{2a}$ and $t_{2b}$.

14. The device of claim 12, wherein the controller is further configured to:
cause the transmitter to transmit a third light beam to the region of interest at a time $t_{3a}$, the time $t_{3a}$ being subsequent to the times $t_{1b}$ and $t_{2b}$, the third light beam configured to reflect off the first object to produce a third reflected light beam;
increment the ToF counter, starting from the second count value, until the reflected third light beam is received;
stop the ToF counter at a third count value when the reflected third light beam is received at time $t_{3b}$; and
compute a real-time acceleration of the first object based at least in part on the first count value, which is a function of $t_{1a} t_{1b}$, and the second count value, which is a function of $t_{2a}$ and $t_{2b}$, and the third count value, which is a function of $t_{3a}$ and $t_{3b}$.

15. The device of claim 14, wherein the acceleration of the first object is computed solely based on the first count value, which is a function of $t_{1a}$ and $t_{1b}$, the second count value, which is a function of $t_{2a}$ and $t_{2b}$, and the third count value, which is a function of $t_{3a}$ and $t_{3b}$.

16. The device of claim 14, wherein the light beams are in the short-wave infrared (SWIR) spectrum.

17. The device of claim 14, wherein the controller is further configured so that, in response to transmitting at least one of the first and second light beams, the controller causes the ToF counter to begin incrementing or decrementing, respectively, at least one of concurrently and after a delay.

18. The device of claim 14, wherein the first light beam and second light beam have different wavelengths.

19. The device of claim 14, wherein the controller is further configured to:

cause the transmitter to transmit a plurality of pairs of first and second light beams at the object, wherein the controller dynamically adjusts a frequency of transmitting the plurality of pairs of first and second light beams, based at least in part on at least one of a detected range to the first object and the velocity of the first object.

20. The device of claim 14, wherein the object has a size and wherein the ToF counter has a maximum value for at least one of incrementing and decrementing, wherein the controller dynamically determines the maximum value based at least in part on at least one of the size, range, velocity, and acceleration of the first object.

* * * * *